US012636965B1

(12) United States Patent
Sreedhar et al.

(10) Patent No.: US 12,636,965 B1
(45) Date of Patent: May 26, 2026

(54) SYSTEMS AND METHODS FOR BI-DIRECTIONAL ONBOARD CHARGER FOR ELECTRIC VEHICLE

(71) Applicant: BorgWarner Inc., Auburn Hills, MI (US)

(72) Inventors: Sunil Sreedhar, Westfield, IN (US); Leonard Tomaj, West Bloomfield, MI (US); Alexandre M. S. Reis, Westfield, IN (US)

(73) Assignee: BorgWarner Inc., Auburn Hills, MI (US)

( * ) Notice: Subject to any disclaimer, the term of this patent is extended or adjusted under 35 U.S.C. 154(b) by 6 days.

(21) Appl. No.: 18/956,823

(22) Filed: Nov. 22, 2024

(51) Int. Cl.
| | |
|---|---|
| *B60L 53/22* | (2019.01) |
| *B60L 50/60* | (2019.01) |
| *H02J 7/02* | (2016.01) |
| *H02M 1/42* | (2007.01) |
| *H02M 1/44* | (2007.01) |
| *H02M 3/335* | (2006.01) |

(52) U.S. Cl.
CPC .............. *B60L 53/22* (2019.02); *B60L 50/60* (2019.02); *H02J 7/02* (2013.01); *H02M 1/4208* (2013.01); *H02M 1/44* (2013.01); *H02M 3/33584* (2013.01); *B60L 2210/10* (2013.01); *B60L 2210/30* (2013.01); *H02J 2207/20* (2020.01)

(58) Field of Classification Search
CPC .... H05K 1/0203; H05K 7/14322; H05K 7/20; B60L 320/15; B60L 363/14
See application file for complete search history.

(56) References Cited

U.S. PATENT DOCUMENTS

| | | | | |
|---|---|---|---|---|
| 2006/0133119 A1* | 6/2006 | Nomura | ........... | H02M 3/33592 363/25 |
| 2018/0183330 A1* | 6/2018 | Assaad | ................. | H02M 3/158 |
| 2020/0023746 A1* | 1/2020 | Kim | .................... | H02M 1/4216 |
| 2021/0376809 A1* | 12/2021 | Yang | ....................... | H02M 1/44 |
| 2022/0410740 A1* | 12/2022 | Jun | ......................... | B60L 53/22 |
| 2023/0011289 A1* | 1/2023 | Kim | .................... | H02M 1/4233 |
| 2024/0283278 A1* | 8/2024 | Takahashi | ................. | H02J 7/02 |

* cited by examiner

*Primary Examiner* — Menatoallah Youssef
*Assistant Examiner* — Esayas G Yeshaw
(74) *Attorney, Agent, or Firm* — Joshua M. Haines; Bookoff McAndrews, PLLC

(57) ABSTRACT

A system for an on-board charger includes: a battery charger including: a direct current to direct current (DC-DC) converter connected to a power factor correction (PFC) subsystem, wherein the PFC subsystem includes one or more leaves, wherein the one or more leaves of the PFC subsystem are operable to configure the PFC subsystem into each of a three-phase operation, a simultaneous charging and split-phase operation, a simultaneous charging, discharging, and split-phase operation, and a simultaneous charging and three-phase operation.

20 Claims, 11 Drawing Sheets

SYSTEMS AND METHODS FOR BI-DIRECTIONAL ONBOARD CHARGER FOR ELECTRIC VEHICLE

TECHNICAL FIELD

Various embodiments of the present disclosure relate generally to a power converter, and, more particularly, to a bi-directional onboard charger for simultaneous charging and discharging.

BACKGROUND

Electric vehicles, for example, may include a charger to charge a battery of the electric vehicle. Electric vehicles may include an inverter to convert power from the battery to power for a system, such as a power outlet, of the vehicle. The charger and the inverter may not be operated simultaneously.

The present disclosure is directed to overcoming one or more of these above-referenced challenges.

SUMMARY OF THE DISCLOSURE

In some aspects, the techniques described herein relate to a system for an on-board charger, the system including: a battery charger including: a direct current to direct current (DC-DC) converter connected to a power factor correction (PFC) subsystem, wherein the PFC subsystem includes one or more leaves, wherein the one or more leaves of the PFC subsystem are operable to configure the PFC subsystem into each of a three-phase operation, a simultaneous charging and split-phase operation, a simultaneous charging, discharging, and split-phase operation, and a simultaneous charging and three-phase operation.

In some aspects, the techniques described herein relate to a system, wherein the on-board charger further includes: a neutral half bridge connected to the one or more leaves; four bypass relays, wherein each of the four bypass relays are connected to each of the one or more leaves and a power input; and an alternating current (AC) electromagnetic interference (EMI) filter connected between the one or more leaves and the four bypass relays.

In some aspects, the techniques described herein relate to a system, wherein the one or more leaves of the PFC subsystem are further operable to configure the PFC subsystem into each of a charging operation, a discharging operation, a split-phase operation, and a simultaneous charging and discharging operation.

In some aspects, the techniques described herein relate to a system, wherein the one or more leaves include: a first leaf including a first inductor, a first upper switch, and a first lower switch, the first inductor connected to the first upper switch and the first lower switch; a second leaf including a second inductor, a second upper switch, and a second lower switch, the second inductor connected to the second upper switch and the second lower switch; a third leaf including a third inductor, a third upper switch, and a third lower switch, the third inductor connected to the third upper switch and the third lower switch; and a fourth leaf including a fourth inductor, a fourth upper switch, and a fourth lower switch, the fourth inductor connected to the fourth upper switch and the fourth lower switch.

In some aspects, the techniques described herein relate to a system, wherein the charging operation is configured to activate the first leaf and the second leaf, and turn off a bypass relay to charge a battery connected to a first power input, wherein each of the first leaf and the second leaf are configured at 180 degree phase shifts.

In some aspects, the techniques described herein relate to a system, wherein the discharging operation is configured to activate the first leaf and the second leaf, and turn off a bypass relay to output AC power received from the DC-DC converter through a first output, wherein each of the first leaf and the second leaf are configured at 180 degree phase shifts.

In some aspects, the techniques described herein relate to a system, wherein the split-phase operation configured to activate the second leaf and the third leaf to output AC power received from the DC-DC converter at a first output voltage and a second output voltage, wherein the first leaf and the second leaf are out-of-phase.

In some aspects, the techniques described herein relate to a system, wherein the simultaneous charging and discharging operation is configured to: operate the first leaf and the fourth leaf to charge a battery connected to a first power input; and operate the second leaf and the third leaf to output AC power received from the DC-DC converter through a first output.

In some aspects, the techniques described herein relate to a system, wherein the three-phase operation is configured to: operate the second leaf, the third leaf, and the fourth leaf to output AC power received from the DC-DC converter at a first output voltage, a second output voltage, and a third output voltage, wherein the second leaf, the third leaf, and the fourth leaf are 120 degrees out-of-phase.

In some aspects, the techniques described herein relate to a system, wherein the simultaneous charging and split-phase operation is configured to: operate the first leaf to charge a battery connected to a first power input; and operate the second leaf and the third leaf to output AC power received from the DC-DC converter at a first output voltage and a second output voltage, wherein the second leaf and the third leaf are out-of-phase.

In some aspects, the techniques described herein relate to a system, wherein the simultaneous charging, discharging, and split-phase operation is configured to: operate the first leaf to charge a battery connected to a first power input; operate the second leaf and the third leaf to output AC power received from the DC-DC converter through a first output at a first output voltage and through a second output a second output voltage, wherein the second leaf and the third leaf are out-of-phase; and operate the fourth leaf to output AC power received from the DC-DC converter through a third output.

In some aspects, the techniques described herein relate to a system, wherein the simultaneous charging and three-phase operation is configured to: operate the first leaf to charge a battery connected to a first power input; and operate the second leaf, the third leaf, and the fourth leaf to output AC power received from the DC-DC converter at a first output voltage, a second output voltage, and a third output voltage, wherein the second leaf, the third leaf, and the fourth leaf are out-of-phase.

In some aspects, the techniques described herein relate to a system, further including: a battery connected to the DC-DC converter of the battery charger, wherein the battery charger receives input AC power through the PFC subsystem, convert the AC power to DC power, and provide the DC power to the battery to charge the battery, and receives DC power from the battery through the DC-DC converter, convert the DC power to AC power, and provide the AC power through the PFC subsystem as output AC power, and a motor configured to rotate based on power received from the battery, wherein the system is provided as a vehicle.

In some aspects, the techniques described herein relate to a power factor correction (PFC) system including: a first leaf including a first inductor, a first upper switch, and a first lower switch, the first inductor connected to the first upper switch and the first lower switch; a second leaf including a second inductor, a second upper switch, and a second lower switch, the second inductor connected to the second upper switch and the second lower switch; a third leaf including a third inductor, a third upper switch, and a third lower switch, the third inductor connected to the third upper switch and the third lower switch; a fourth leaf including a fourth inductor, a fourth upper switch, and a fourth lower switch, the fourth inductor connected to the fourth upper switch and the fourth lower switch; a first bypass relay connected to the first leaf and the second leaf; a second bypass relay connected to the first leaf and the fourth leaf; a third bypass relay connected to the third leaf and the fourth leaf; and a fourth bypass relay connected to the second leaf and the third leaf.

In some aspects, the techniques described herein relate to a PFC system, wherein the first leaf, the second leaf, the third leaf, and the fourth leaf are operable to configure the PFC system into each of a three-phase operation, a simultaneous charging and split-phase operation, a simultaneous charging, discharging, and split-phase operation, and a simultaneous charging and three-phase operation.

In some aspects, the techniques described herein relate to a PFC system, wherein the first leaf, the second leaf, the third leaf, and the fourth leaf are further operable to configure the PFC system into each of a charging operation, a discharging operation, a split-phase operation, and a simultaneous charging and discharging operation.

In some aspects, the techniques described herein relate to a PFC system, wherein the three-phase operation is configured to operate the second leaf, the third leaf, and the fourth leaf to output AC power received from a DC-DC converter at a first output voltage, a second output voltage, and a third output voltage, wherein the second leaf, the third leaf, and the fourth leaf are 120 degrees out-of-phase, wherein the simultaneous charging and split-phase operation is configured to operate the first leaf to charge a battery connected to a first power input, and operate the second leaf and the third leaf to output AC power received from the DC-DC converter at a first output voltage and a second output voltage, wherein the second leaf and the third leaf are out-of-phase, wherein the simultaneous charging, discharging, and split-phase operation is configured to operate the first leaf to charge a battery connected to a first power input; and operate the second leaf and the third leaf to output AC power received from the DC-DC converter at a first output voltage and a second output voltage, wherein the second leaf and the third leaf are out-of-phase, and operate the fourth leaf to output AC power received from the DC-DC converter through a first output, and wherein the simultaneous charging and three-phase operation is configured to operate the first leaf to charge a battery connected to a first power input, and operate the second leaf, the third leaf, and the fourth leaf to output AC power received from the DC-DC converter at a first output voltage, a second output voltage, and a third output voltage, wherein the second leaf, the third leaf, and the fourth leaf are out-of-phase.

In some aspects, the techniques described herein relate to a method including: operating a second leaf, a third leaf, and a fourth leaf of a PFC subsystem to perform a three-phase operation, wherein the three-phase operation is configured to output AC power received from a DC-DC converter at a first output voltage, a second output voltage, and a third output voltage; operating a first leaf, the second leaf, and the third leaf of the PFC subsystem to perform a simultaneous charging and split-phase operation, wherein the simultaneous charging and split-phase operation is configured to charge a battery connected to a first power input and output AC power received from the DC-DC converter at the first output voltage and the second output voltage; operating the first leaf, the second leaf, the third leaf, and the fourth leaf of the PFC subsystem to perform a simultaneous charging, discharging, and split-phase operation, wherein the simultaneous charging, discharging, and split-phase operation is configured to charge the battery connected to the first power input, output AC power received from the DC-DC converter at the first output voltage and the second output voltage, and output AC power received from the DC-DC converter through a first output; and operating the first leaf, the second leaf, the third leaf, and the fourth leaf of the PFC subsystem to perform a simultaneous charging and three-phase operation, wherein the simultaneous charging and three-phase operation is configured to charge the battery connected to the DC-DC converter and output AC power received from the DC-DC converter at the first output voltage, the second output voltage, and the third output voltage.

In some aspects, the techniques described herein relate to a method, further including: operating the first leaf and the second leaf of the PFC subsystem to perform a charging operation, wherein the charging operation is configured to charge the battery connected to the DC-DC converter; and operating the first leaf and the second leaf of the PFC subsystem to perform a discharging operation, wherein the discharging operation is configured to output AC power received from the DC-DC converter.

In some aspects, the techniques described herein relate to a method, further including: operating the second leaf and the third leaf of the PFC subsystem to perform a split-phase operation, wherein the split-phase operation is configured to output out-of-phase AC power received from the DC-DC converter; and operating the first leaf, the second leaf, the third leaf, and the fourth leaf of the PFC subsystem to perform a simultaneous charging and discharging operation, wherein the simultaneous charging and discharging operation is configured to charge the battery connected to the DC-DC converter and output AC power received from the DC-DC converter.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
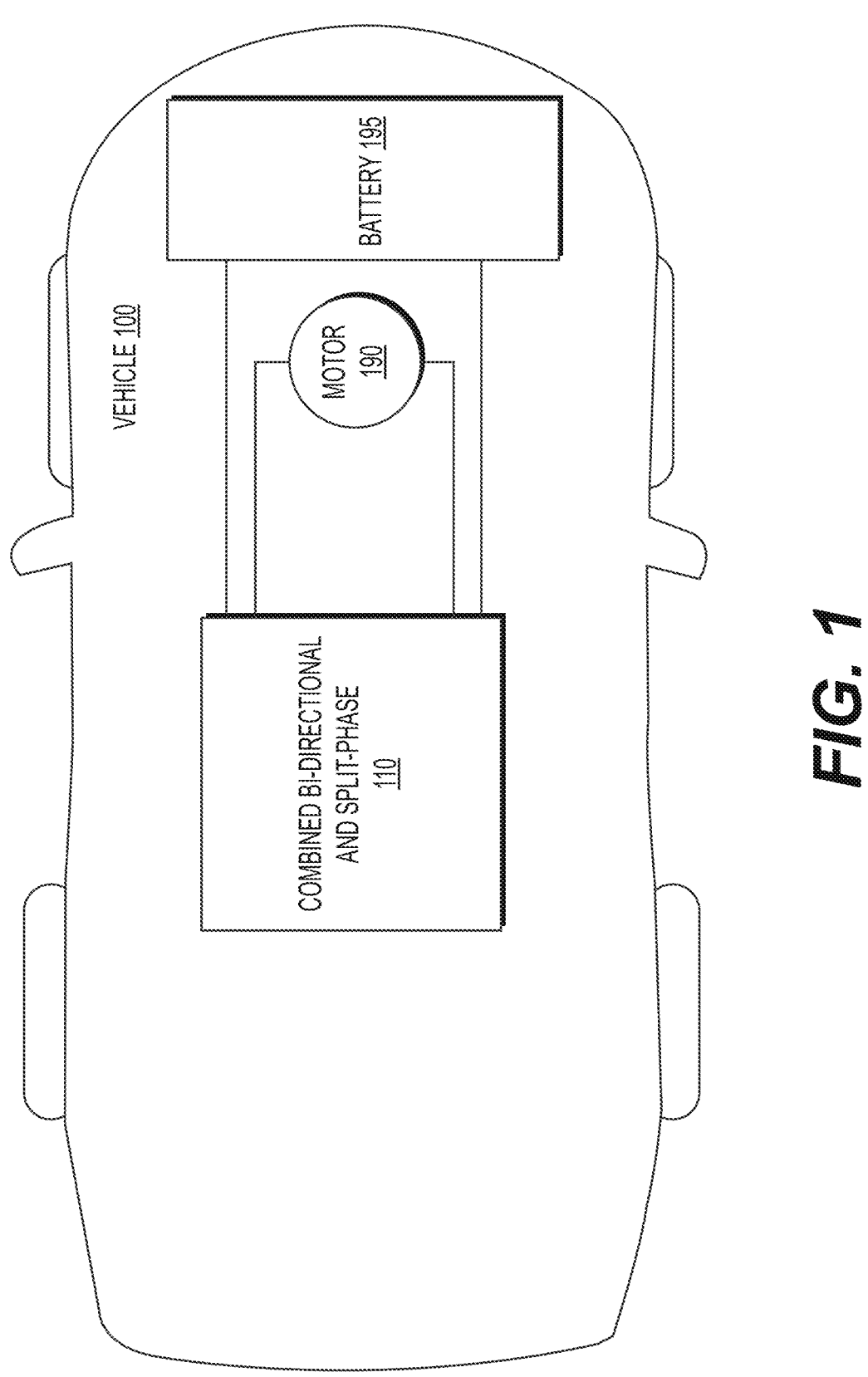
FIG. 1 depicts an exemplary system infrastructure for a vehicle including a combined bi-directional and split-phase converter, according to one or more embodiments.

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value. In this disclosure, unless stated otherwise, any numeric value may include a possible variation of ±10% in the stated value.

Various embodiments of the present disclosure relate generally to a power converter, and, more particularly, to a bi-directional onboard charger for simultaneous charging and discharging.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Electric vehicles (EV) are becoming more popular with prices of fuel going up and standards for fuel emissions becoming stricter. Besides using EVs as vehicles, other applications are emerging such as energy storage and backup generators. The on-board charger (OBC) may have a dual purpose. The purpose of the bidirectional system may include converting AC to DC voltage in charging mode and DC to AC in discharge or inverter mode. Charge mode may be used to convert grid AC into DC voltage to charge the vehicle's high voltage (HV) battery. Discharge or inverter mode converts the HV battery DC voltage into AC voltage that may go back to the grid, be supplied as a back generator to power a house when the grid is down, or as an inverter to supply voltage to the vehicle's AC outlets, for example.

The ability of the OBC to supply different loads along with performing the bi-directional power conversion may be an attractive option for automotive companies to reduce cost and space needed for different components in the vehicle. The ability to simultaneously charge and discharge may be an attractive option that may allow an EV to charge its HV battery and generate AC at different voltage levels, such as 120 Vrms and 240 Vrms.

This design may create more options for power conversion by fully utilizing the power stages of the OBC to perform (1) OBC charging operation (e.g., charging HV battery), (2) OBC discharging operation (e.g., supplying single-phase AC power to loads/grids), (3) split-phase inverter operation (e.g., supply split-phase power to loads/home/grids), (4) simultaneously charging and discharging operations, (5) three-phase inverter operation (e.g., supply three-phase power to load/home/grid), (6) simultaneous charging and split-phase operation, (7) simultaneous charging, split-phase, and discharging operations, and (8) simultaneous charging and three-phase operations. This design may combine the charging and discharging (e.g., single-phase, split-phase, and three-phase) inverter products into the same hardware with the option of performing charging (e.g., single-phase input) and discharging operation (e.g., single-phase, split-phase, and three-phase) at the same time. The combined converter approach may reduce the component count, increase power density, and reduce overall product size needed to perform all eight operations. The Power Factor Correction (PFC) subsystem contains four PFC leaves, one Neutral half bridge, a bypass relay matrix (e.g., four bypass relays), and an AC Electromagnetic Interference (EMI) filter. The PFC hardware may be operated to achieve all power conversion options while maintaining the same DC/DC converter section.

During the OBC charging only operation, high power and better EMI performance may be achieved by utilizing the four PFC leaves and turning ON the bypass relay matrix. Operating the bypass relay matrix in the ON position may include turning each bypass relay ON or OFF depending on the application. This may allow for increased utilization of the product hardware. The four PFC leaves may be switched at 90 degree phase shifts, allowing for more efficient ripple cancellation and reducing EMI noise. If lower power is needed, the bypass relays may be turned off and a lower number of PFC leaves may be operated to achieve higher efficiency, while maintaining good EMI performance due to ripple cancellation of the out-of-phase switching Pulse Width Modulation (PWM). Utilizing the bypass relays, the four PFC leaves may be operated in pairs to distribute the power during lower power operation and equalize the utilization of the PFC leaves during the lifetime of the product.

During the OBC discharging only operation (e.g., single-phase output), high power and better EMI performance may be achieved by utilizing the four PFC leaves and turning ON the bypass relay. This may allow for increased utilization of the product hardware. The four PFC leaves may be switched at 90 degree phase shifts, allowing for more efficient ripple cancellation and reducing EMI noise. If lower power is needed, the bypass relay may be turned off and a lower number of PFC leaves may be operated to achieve higher efficiency, while maintaining good EMI performance due to ripple cancellation of the out-of-phase switching PWM. For example, operating three PFC leaves may be switched at 120 degree phase shifts and operating two PFC leaves may be switched at 180 degree phase shifts. Utilizing the bypass relay, the four PFC leaves may be operated in pairs to distribute the power during lower power operation and equalize the utilization of the PFC leaves during the lifetime of the product. In addition, the OBC discharging output may be generated at four different connector locations on the product thus reducing the wiring needed in the vehicle.

During the split-phase inverter only operation, two PFC leaves (e.g., PFC leaf 2 and PFC leaf 3) may be used to generate the out-of-phase AC output voltages which may be operated simultaneously to power a split-phase load or in unbalanced mode to power a split-phase load and a single-phase load. If split-phase inverter operation requires more power, PFC leaf 1 may be combined with PFC leaf 2 and PFC leaf 3 may be combined with PFC leaf 4. The additional leaves may also reduce EMI noise by operating them with out-of-phase, 180 degrees, PWMs. In addition, the split-phase inverter output may be generated at two different connectors (e.g., PFC leaf 1 and PFC leaf 4, or PFC leaf 2 and PFC leaf 3) locations on the product, which may reduce the wiring needed in the vehicle.

During the three-phase inverter operation, three PFC leaves (e.g., PFC leaf2, PFC leaf 3, and PFC leaf 4) may be used to generate the three-phase AC output voltages which may be operated simultaneously to power a three-phase load. The same operation may be used to power an unbalanced three-phase load as a neutral connection is available and may carry the unbalanced current.

During the OBC charging and discharging simultaneous operation (e.g., single-phase output), depending on the power level needed for charging and discharging, different PFC leaves may be used. If more power is needed, multiple PFC leaves may be connected using the bypass relays to charge the HV battery from the AC grid and the remaining PFC leaves may be used to generate AC output voltage to power AC single phase loads. The simultaneous operation ensures full utilization of hardware and reduces the amount of neutral current in the neutral half bridge of the PFC, hence reducing overall losses.

During the OBC charging and discharging simultaneous operation (e.g., split-phase output), depending on the power level needed for the charging and discharging operations, different PFC leaves may be used. If more charging power is needed, PFC leaf 1 and PFC leaf 4 may be connected using bypass relays to charge the HV battery from the AC grid, and PFC leaf 2 and PFC leaf 3 may be used to generate the split-phase AC output voltage to power AC split-phase or unbalanced loads (e.g., single-phase and split-phase loads). The simultaneous operation may ensure full utilization of hardware and may reduce the amount of neutral current in the neutral half bridge of the PFC, hence reducing overall losses.

During the OBC charging and discharging simultaneous operation (e.g., three-phase output), PFC leaf 1 may be used to charge the HV battery from the AC grid. PFC leaf 2, PFC leaf 3, and PFC leaf 4 may be used to generate the three-phase AC output voltage to power AC three-phase or unbalanced loads (if neutral connection is available). The simultaneous operation may ensure full utilization of hardware and may reduce the amount of neutral current (in case of unbalanced three-phase loads) in the neutral half bridge of the PFC, hence reducing overall losses.

By maximizing the PFC utilization, the high voltage DC-DC converter of the OBC may be designed for rated power of the product and the PFC subsystem may provide the flexibility to perform different power conversion options.

The input and output layout of the charger may follow automotive standards. A battery charger according to the disclosure may include a two-stage configuration, including an AC-DC power factor correction converter stage and an isolated DC-DC converter stage. The isolated DC-DC converter may include a half-bridge or a full-bridge driver configuration with resonant tank elements to achieve better efficiency. The DC-DC converter may be designed to charge the battery back from minimum voltage to maximum voltage.

The converter may receive power from an AC power source and provide DC power to a battery, or receive power from the battery and provide power as an AC power source. A vehicle to grid (V2G) operation may be achieved with a designed control strategy for single-phase and two-phase systems. The switches may be any devices, such as GTO, thyristors, or MOSFETs/IGBTs with series diodes, for example. These switches may also be mechanical components (such as relays or contactors) if sufficient failure rates and arcing conditions during operation are met.

FIG. 1 depicts an exemplary system infrastructure for a vehicle including a combined inverter and converter, according to one or more embodiments. In the context of this disclosure, the combined inverter and converter may be referred to as an inverter. As shown in FIG. 1, electric vehicle 100 may include a battery charger 110, a motor 190, and a battery pack 195. The battery charger 110 may include components to receive electrical power from an external source and output electrical power to charge battery pack 195 of electric vehicle 100. The battery charger 110 may convert DC power from battery pack 195 in electric vehicle 100 to AC power, to drive motor 190 of the electric vehicle 100, for example, but the embodiments are not limited thereto. The battery charger 110 may be bidirectional, and may convert DC power to AC power, or convert AC power to DC power, such as during regenerative braking, for example. Battery charger 110 may be a single-phase inverter or a multi-phase inverter.

Figure 2:
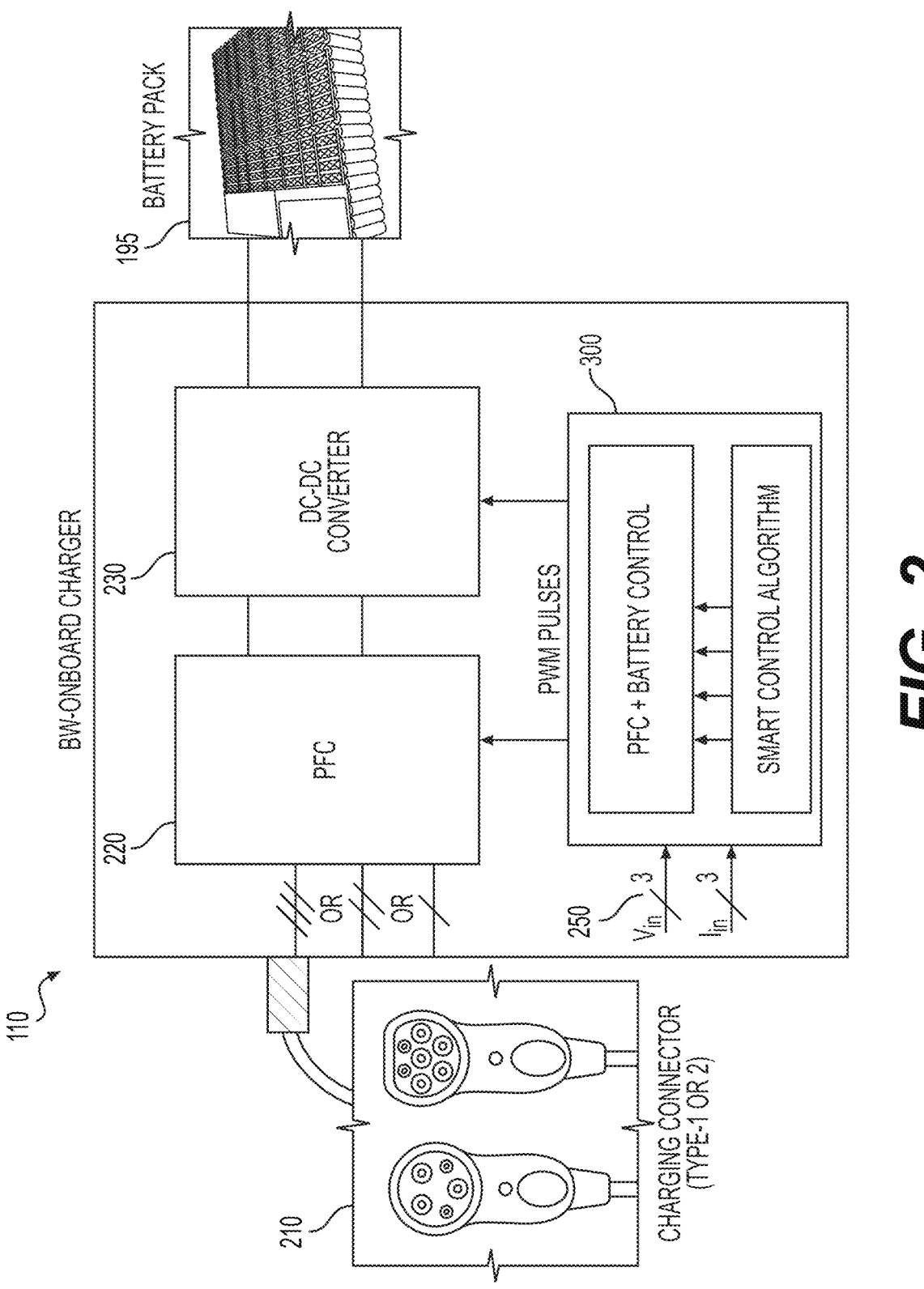
FIG. 2 depicts an exemplary system infrastructure for a battery charger, according to one or more embodiments.

FIG. 2 depicts an exemplary system infrastructure for a battery charger with a DC-DC converter, according to one or more embodiments. As shown in FIG. 2, a battery charger 110 may include or be electrically connectable to a charging connector 210. The charging connector 210 may provide an electrical connection from an external power supply to the battery charger 110, and may be a Type 1 or a Type 2 connector, for example. The charging connector 210 may transfer single phase or two-phase power.

The battery charger 110 may include a PFC subsystem 220, a DC-DC converter 230, and a controller 300 receiving signals from input sensor 250. The battery charger 110 may include or be electrically connectable to a battery pack 195. The battery charger 110 may be used in automotive vehicles as an onboard charger to transfer power from an external power source through charging connector 210 to battery pack 195, or to transfer power from battery pack 195 in a vehicle to grid operation. The battery charger 110 may be included in a system provided as an electric vehicle including a motor configured to rotate based on power received from the battery pack 195.

Figure 3:
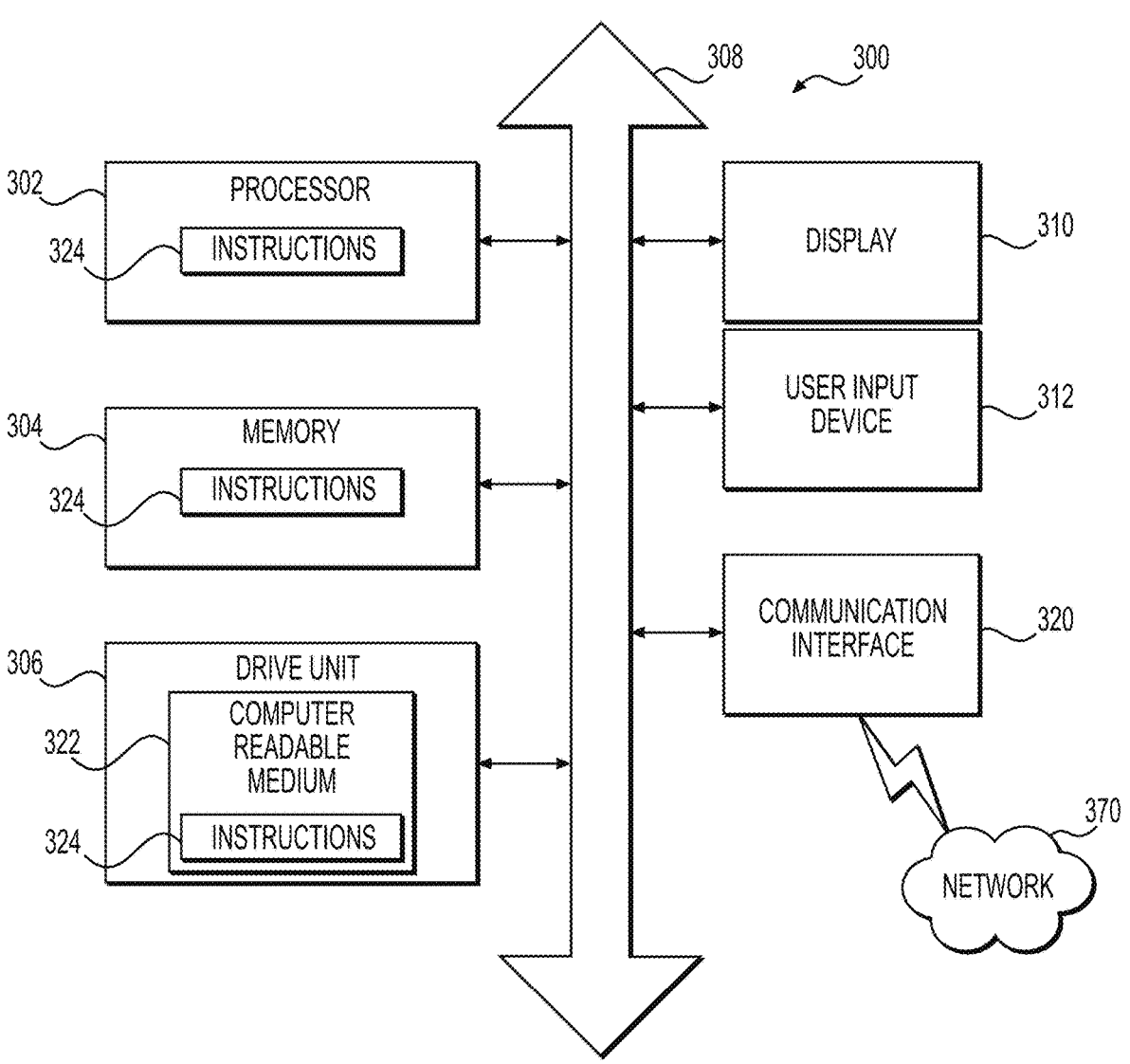
FIG. 3 depicts an implementation of a computer system that may execute techniques presented herein, according to one or more embodiments.

FIG. 3 depicts an implementation of a controller 300 that may execute techniques presented herein, according to one or more embodiments.

Any suitable system infrastructure may be put into place to allow control of the battery charger. FIG. 3 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 3. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

The controller 300 may include a set of instructions that can be executed to cause the controller 300 to perform any one or more of the methods or computer-based functions disclosed herein. The controller 300 may operate as a standalone device or may be connected, e.g., using a network, to other computer systems or peripheral devices.

In a networked deployment, the controller 300 may operate in the capacity of a server or as a client in a server-client user network environment, or as a peer computer system in a peer-to-peer (or distributed) network environment. The controller 300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the controller 300 can be implemented using electronic devices that provide voice, video, or data communication. Further, while the controller 300 is illustrated as a single system, the term "system" shall also be taken to include any collection of systems or sub-systems that individually or jointly execute a set, or multiple sets, of instructions to perform one or more computer functions.

As illustrated in FIG. 3, the controller 300 may include a processor 302, e.g., a central processing unit (CPU), a graphics processing unit (GPU), or both. The processor 302 may be a component in a variety of systems. For example, the processor 302 may be part of a standard computer. The processor 302 may be one or more general processors, digital signal processors, application specific integrated circuits, field programmable gate arrays, servers, networks, digital circuits, analog circuits, combinations thereof, or other now known or later developed devices for analyzing and processing data. The processor 302 may implement a software program, such as code generated manually (i.e., programmed).

The controller 300 may include a memory 304 that can communicate via a bus 308. The memory 304 may be a main memory, a static memory, or a dynamic memory. The memory 304 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 304 includes a cache or random-access memory for the processor 302. In alternative implementations, the memory 304 is separate from the processor 302, such as a cache memory of a processor, the system memory, or other memory. The memory 304 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 304 is operable to store instructions executable by the processor 302. The functions, acts or tasks illustrated in the figures or described herein may be performed by the processor 302 executing the instructions stored in the memory 304. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the controller 300 may further include a display 310, such as a liquid crystal display (LCD), an organic light emitting diode (OLED), a flat panel display, a solid-state display, a cathode ray tube (CRT), a projector, a printer or other now known or later developed display device for outputting determined information. The display 310 may act as an interface for the user to see the functioning of the processor 302, or specifically as an interface with the software stored in the memory 304 or in the drive unit 306.

Additionally or alternatively, the controller 300 may include an input device 312 configured to allow a user to interact with any of the components of controller 300. The input device 312 may be a number pad, a keyboard, or a cursor control device, such as a mouse, or a joystick, touch screen display, remote control, or any other device operative to interact with the controller 300.

The controller 300 may also or alternatively include drive unit 306 implemented as a disk or optical drive. The drive unit 306 may include a computer-readable medium 322 in which one or more sets of instructions 324, e.g. software, can be embedded. Further, the instructions 324 may embody one or more of the methods or logic as described herein. The instructions 324 may reside completely or partially within the memory 304 and/or within the processor 302 during execution by the controller 300. The memory 304 and the processor 302 also may include computer-readable media as discussed above.

In some systems, a computer-readable medium 322 includes instructions 324 or receives and executes instructions 324 responsive to a propagated signal so that a device connected to a network 370 can communicate voice, video, audio, images, or any other data over the network 370. Further, the instructions 324 may be transmitted or received over the network 370 via a communication port or interface 320, and/or using a bus 308. The communication port or interface 320 may be a part of the processor 302 or may be a separate component. The communication port or interface 320 may be created in software or may be a physical connection in hardware. The communication port or interface 320 may be configured to connect with a network 370, external media, the display 310, or any other components in controller 300, or combinations thereof. The connection with the network 370 may be a physical connection, such as a wired Ethernet connection or may be established wirelessly as discussed below. Likewise, the additional connections with other components of the controller 300 may be physical connections or may be established wirelessly. The network 370 may alternatively be directly connected to a bus 308.

While the computer-readable medium 322 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 322 may be non-transitory, and may be tangible.

The computer-readable medium 322 can include a solid-state memory such as a memory card or other package that houses one or more non-volatile read-only memories. The computer-readable medium 322 can be a random-access memory or other volatile re-writable memory. Additionally or alternatively, the computer-readable medium 322 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The controller 300 may be connected to a network 370. The network 370 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 370 may include wide area networks (WAN), such as the Internet, local area networks (LAN), campus area networks, metropolitan area networks, a direct connection such as through a Universal Serial Bus (USB) port, or any other networks that may allow for data communication. The network 370 may be configured to couple one computing device to another computing device to enable communication of data between the devices. The network 370 may generally be enabled to employ any form of machine-readable media for communicating information from one device to another. The network 370 may include communication methods by which information may travel between computing devices. The network 370 may be divided into sub-networks. The sub-networks may allow access to all of the other components connected thereto or the sub-networks may restrict access between the components. The network 370 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Figure 4:
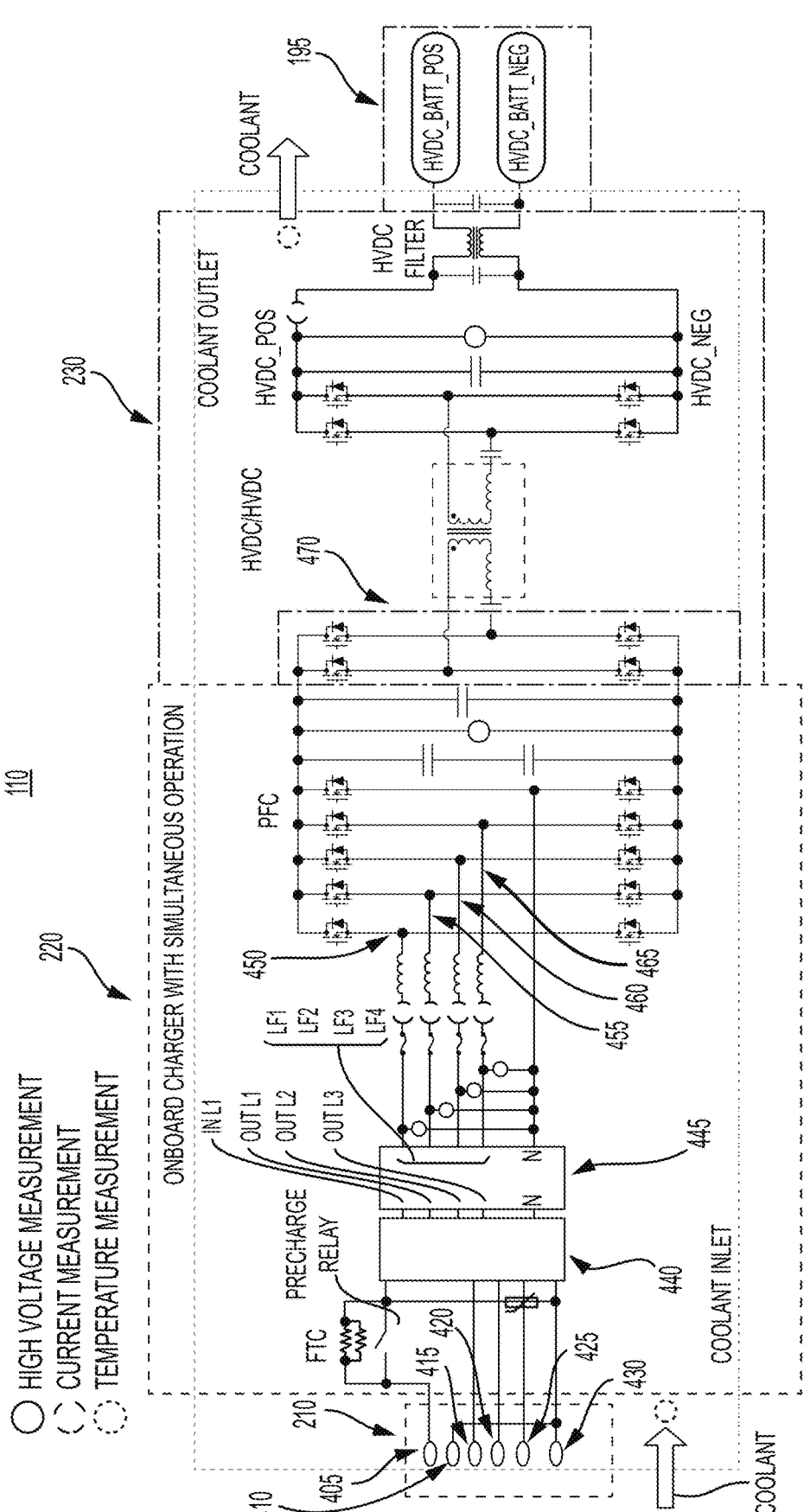
FIG. 4 depicts an exemplary electrical schematic for a battery charger, according to one or more embodiments.

FIG. 4 depicts an exemplary electrical schematic for a battery charger with a lower power requirement, according to one or more embodiments. As shown in FIG. 4, the battery charger 110 may include the charging connector 210, the PFC subsystem 220, the DC-DC converter 230, and the battery pack 195 as discussed above with respect to FIG. 2. The charging connector 210 may include a first input connector 405, a first neutral connector 410, a first output connector 415, a second output connector 420, a third output connector 425, and a second neutral connector 430 connecting the charging connector 210 to the PFC subsystem 220. The PFC subsystem 220 may perform operations of (1) OBC charging operation (e.g., charging HV battery), (2) OBC discharging operation (e.g., supplying single-phase AC power to loads/grids), (3) split-phase inverter operation (e.g., supply split-phase power to loads/home/grids), (4) simultaneously charging and discharging operations, (5) three-phase inverter (e.g., supply three-phase power to loads/home/grids), (6) simultaneous charging and split-phase operation, (7) simultaneous charging, split-phase, and discharging operations, and (8) simultaneous charging and three-phase operations.

During OBC charging operation, the first input connector 405 with respect to the first neutral connector 410 may receive power (e.g., AC power) from an external energy source to be provided to the PFC subsystem 220. During OBC discharging operation, the first output connector 415, with respect to the second neutral connector 430, may receive converted AC power from the DC-DC converter 230 for output back to the grid or as a backup generator for a home. In addition, the first output connector 415 may be used as an AC power outlet for a power outlet of a vehicle.

During split-phase inverter operation, the first output connector 415 and the second output connector 420 may both be used as outputs with respect to the second neutral connector 430. During simultaneous charging and discharging operation, the first input connector 405, with respect to the first neutral connector 410, may receive power from an external energy source to be provided to the PFC subsystem 220, and the first output connector 415, with respect to the second neutral connector 430, may receive converted AC power from the DC-DC converter 230 for output.

During three-phase operation, the first output connector 415, the second output connector 420, and the third output connector 425, with respect to the second neutral connector 430, may receive converted AC power from the DC-DC converter 230 for output. During simultaneous charging and split-phase operation, the first input connector 405, with respect to the first neutral connector 410, may receive power from an external energy source to be provided to the PFC subsystem 220, and the first output connector 415 and the second output connector 420 may both be used as outputs with respect to the second neutral connector 430.

During simultaneous charging, split-phase, and discharging operations, the first input connector 405, with respect to the first neutral connector 410, may receive power from an external energy source to be provided to the PFC subsystem 220, the first output connector 415 and the second output connector 420 may both be used as outputs with respect to the second neutral connector 430, and the third output connector 425, with respect to the second neutral connector 430, may receive converted AC power from the DC-DC converter 230 for output. During simultaneous charging and three-phase operations, the first input connector 405, with respect to the first neutral connector 410, may receive power from an external energy source to be provided to the PFC subsystem 220, and the first output connector 415, the second output connector 420, and the third output connector 425, with respect to the second neutral connector 430, may receive converted AC power from the DC-DC converter 230 for output.

The PFC subsystem 220 may include an AC EMI filter 440, a bypass relay matrix 445, a first leaf 450, a second leaf 455, a third leaf 460, and a fourth leaf 465. The bypass relay matrix 445 may be arranged on an input side or an output side of the AC EMI filter 440 with respect to the charging connector 210. Arranging the bypass relay matrix 445 on either side of the AC EMI filter 440 may provide benefits in addition to the advantages as described above. As shown in FIG. 4, the bypass relay matrix 445 may be connected to each of the first leaf 450, the second leaf 455, the third leaf 460, and the fourth leaf 465. The bypass relay matrix 445 may include one or more bypass relays (see FIG. 5) which may be configured in the ON or OFF position to increase power depending on the application. The use of the AC EMI filter 440 and the bypass relay matrix 445 may be advantageous during a high power application to increase the noise filtering of the AC EMI filter 440.

The first leaf 450 may include an inductor and one or more switches (e.g., upper switch and lower switch). The second leaf 455 may include an inductor and one or more switches (e.g., upper switch and lower switch). The third leaf 460 may include an inductor and one or more switches (e.g., upper switch and lower switch). The fourth leaf 465 may include an inductor and one or more switches (e.g., upper switch and lower switch). The first leaf 450, the second leaf 455, the third leaf 460, and the fourth leaf 465 may connect the PFC subsystem 220 to the DC-DC converter 230 through bridge 470. The first leaf 450, the second leaf 455, the third leaf 460, and the fourth leaf 465 may be operated by a pulse width modulation (PWM) (not shown) via controller 300 at the same or different phase shifts.

The PFC subsystem 220 may be configured to operate in each of an (1) OBC charging operation (e.g., charging HV battery), (2) OBC discharging operation (e.g., supplying AV power to loads/grids), (3) split-phase inverter operation (e.g., supply split-phase power to loads/home/grids), (4) simultaneously charging and discharging operations, (5) three-phase inverter (e.g., supply three-phase power to loads/home/grids), (6) simultaneous charging and split-phase operation, (7) simultaneous charging, split-phase, and discharging operations, and (8) simultaneous charging and three-phase operations. According to an embodiment, the PFC subsystem 220 may be configured in the OBC charging only operation and may charge the battery pack 195. The PFC subsystem 220 may receive input power (e.g., AC power) through the first input connector 405 with respect the first neutral connector 410. The first leaf 450 and the second leaf 455 may be switched at 180 degree phase shifts, which may provide more efficient ripple cancellation and reduction in EMI noise. For additional power requirements, the first leaf 450, the second leaf 455, the third leaf 460, and/or the fourth leaf 465 may be used and switched at 90 degree phase shifts from one another. The bypass relay matrix 445 may include one or more bypass relays (see FIG. 5) which may be configured in the ON or OFF position to increase power depending on the application. The bypass relay matrix 445 may be configured in the OFF position for standard or low power applications, and alternatively, the bypass relay matrix 445 may be configured in the ON position for increased power applications. The input power received at the first input connector 405 may be provided through the first leaf 450, the second leaf 455, the third leaf 460, and/or the fourth leaf 465, depending on the power application, to the bridge 470 and the DC-DC converter 230. The DC-DC converter 230 may be configured to convert the input power (e.g., AC power) to DC voltages for charging the battery pack 195.

According to an embodiment, the PFC subsystem 220 may be configured in the OBC discharging only operation and may provide AC power back to the grid, a backup generator, or the like. The battery pack 195 may provide DC voltage to the DC-DC converter 230, and the DC-DC converter 230 may convert the DC voltage to AC voltage and may be provided to the PFC subsystem 220. As similarly described above, the first leaf 450 and the second leaf 455 may be switched at 90 degree phase shifts, which may provide more efficient ripple cancellation and reduction in EMI noise. For additional power requirements, the first leaf 450, the second leaf 455, the third leaf 460, and/or the fourth leaf 465 may be used and switched at 180 degree phase shifts from one another. The bypass relay matrix 445 may include one or more bypass relays (see FIG. 5) which may be configured in the ON or OFF position to increase power depending on the application. The bypass relay matrix 445 may be configured in the OFF position for standard or low power applications, and alternatively, the bypass relay matrix 445 may be configured in the ON position for increased power applications. The AC voltage received from the DC-DC converter 230 may be output through the first output connector 415 for use by the grid, backup generator, or the like. The battery charger 110 may include four different connector locations to reduce the wiring requirements in a vehicle.

According to an embodiment, the PFC subsystem 220 may be configured in the split-phase inverter operation and may provide out-of-phase AC output voltages to power a split-phase load. As similarly described in the discharging only operation, the battery pack 195 may provide DC voltage to the DC-DC converter 230, and the DC-DC converter 230 may convert the DC voltage to AC voltage and may be provided to the PFC subsystem 220. The second leaf 455 and the third leaf 460 may be switched at out-of-phase shifts from one another. For additional power applications, the first leaf 450 may be combined with the second leaf 455 and the third leaf 460 may be combined with the fourth leaf 465. The use of the first leaf 450 and the fourth leaf 465 may reduce the EMC noise by operating each leaf out-of-phase. The bypass relay matrix 445 may include one or more bypass relays (see FIG. 5) which may be configured in the ON or OFF position to increase power depending on the application. The bypass relay matrix 445 may be configured in the OFF position for standard or low power applications, and alternatively, the bypass relay matrix 445 may be configured in the ON position for increased power applications. The AC voltage generated by the PFC subsystem 220 using the energy received from the DC-DC converter 230 may be split-phase and output on the first output connector 415 and the second output connector 420 for use by the grid, backup generator, or the like, with respect to the second neutral connector 430.

According to an embodiment, the PFC subsystem 220 may be configured in the simultaneous charging and discharging operation and may charge the battery pack 195 and may provide AC power back to the grid, a backup generator, or the like at the same time. As similarly described above, the PFC subsystem 220 may receive input power (e.g., AC power) through the first input connector 405 with respect the first neutral connector 410. For example, the first leaf 450 and the second leaf 455 may be switched at 180 degree phase shifts, which may provide more efficient ripple cancellation and reduction in EMI noise. For additional power requirements, the first leaf 450, the second leaf 455, the third leaf 460, and/or the fourth leaf 465 may be used and switched at out-of-phase from one another. Additional combinations of leaves may be employed for each of the charging and discharging operations. The bypass relay matrix 445 may include one or more bypass relays (see FIG. 5) which may be configured in the ON or OFF position to increase power depending on the application. The bypass relay matrix 445 may be configured in the OFF position for standard or low power applications, and alternatively, the bypass relay matrix 445 may be configured in the ON position for increased power applications. The input power received at the first input connector 405 with respect to the first neutral connector 410 may be provided through one or more leaves (e.g., the first leaf 450, the second leaf 455, the third leaf 460, and/or the fourth leaf 465) to the bridge 470 and the DC-DC converter 230. The DC-DC converter 230 may be configured to convert the input power (e.g., AC power) to DC voltages for charging the battery pack 195. At the same time, the battery pack 195 may provide DC voltage to the DC-DC converter 230, and the DC-DC converter 230 may convert the DC voltage to AC voltage and may be provided to the PFC subsystem 220. The AC voltage generated by the PFC subsystem 220 using the energy received from the DC-DC converter 230 may be output through the first output connector 415 for use by the grid, backup generator, or the like. The battery charger 110 may include two different connector locations (e.g., the first output connector 415 and the second output connector 420, with respect to the second neutral connector 430) to reduce the wiring requirements in a vehicle.

According to an embodiment, the PFC subsystem 220 may be configured in the three-phase inverter operation and may provide 120 degree phase shifted AC output voltages to power a three-phase load. As similarly described in the three-phase inverter operation, the battery pack 195 may provide DC voltage to the DC-DC converter 230, and the DC-DC converter 230 may convert the DC voltage to AC voltage and may be provided to the PFC subsystem 220. For example, the second leaf 455, the third leaf 460, and fourth leaf 465 may be used. The bypass relay matrix 445 may include one or more bypass relays (see FIG. 5) which may be configured in the ON position. The AC voltage generated by the PFC subsystem 220 using the energy received from the DC-DC converter 230 may be three-phase and output on the first output connector 415, the second output connector 420, and the third output connector 425 for use by the grid, backup generator, or the like, with respect to the second neutral connector 430.

According to an embodiment, the PFC subsystem 220 may be configured in the simultaneous charging and split-phase operation may charge the battery pack 195 and may provide out-of-phase AC output voltages to power a split-phase load at the same time. As similarly described above, the PFC subsystem 220 may receive input power (e.g., AC power) through the first input connector 405 with respect the first neutral connector 410. The first leaf 450 and the fourth leaf 465 may be used. In addition, the first leaf 450 and the fourth leaf 465 may be switched at 180 degree phase shifts allowing for more efficient ripple cancellation and reduction in EMI noise. The bypass relay matrix 445 may include one or more bypass relays (see FIG. 5) which may be configured in the ON or OFF position to increase power depending on the application. The input power received at the first input connector 405 with respect to the first neutral connector 410 may be provided through one or more leaves (e.g., the first leaf 450 and the fourth leaf 465) to the bridge 470 and the DC-DC converter 230. The DC-DC converter 230 may be configured to convert the input power (e.g., AC power) to DC voltages for charging the battery pack 195. At the same time, the battery pack 195 may provide DC voltage to the DC-DC converter 230, and the DC-DC converter 230 may convert the DC voltage to AC voltage and may be provided to the PFC subsystem 220. The second leaf 455 and the third leaf 460 may be used. The AC voltage generated by the PFC subsystem 220 using the energy received from the DC-DC converter 230 may be split-phase and output on the first output connector 415 and the second output connector 420 for use by the grid, backup generator, or the like, with respect to the second neutral connector 430.

According to an embodiment, the PFC subsystem 220 may be configured in the simultaneous charging, split-phase, and discharging operations, may charge the battery pack 195, may provide AC power back to the grid, a backup generator, or the like, and may provide out-of-phase AC output voltages to power a split-phase load at the same time. As similarly described above, the PFC subsystem 220 may receive input power (e.g., AC power) through the first input connector 405 with respect the first neutral connector 410. The first leaf 450 may be used for the charging operation, the second leaf 455 and the third leaf 460 may be used for the split-phase operation, and the fourth leaf 465 may be used for the discharging operation. The bypass relay matrix 445 may include one or more bypass relays (see FIG. 5) which may be configured in the ON or OFF position to increase power depending on the application. The input power received at the first input connector 405 with respect to the first neutral connector 410 may be provided through the first leaf 450 to the bridge 470 and the DC-DC converter 230. The DC-DC converter 230 may be configured to convert the input power (e.g., AC power) to DC voltages for charging the battery pack 195. At the same time, the battery pack 195 may provide DC voltage to the DC-DC converter 230, and the DC-DC converter 230 may convert the DC voltage to AC voltage and may be provided to the PFC subsystem 220. The single-phase AC voltage generated by the PFC subsystem 220 using the energy received from the DC-DC converter 230 may be output through the third output connector 425 for use by the grid, backup generator, or the like with respect to the second neutral connector 430. At the same time, the battery pack 195 may provide DC voltage to the DC-DC converter 230, and the DC-DC converter 230 may convert the DC voltage to AC voltage and may be provided to the PFC subsystem 220. The second leaf 455 and the third leaf 460 may be used for the split-phase operation. The AC voltage generated by the PFC subsystem 220 using the energy received from the DC-DC converter 230 may be split-phase and output on the first output connector 415 and the second output connector 420 for use by the grid, backup generator, or the like, with respect to the second neutral connector 430.

According to an embodiment, the PFC subsystem 220 may be configured in the simultaneous charging and three-phase operations, may charge the battery pack 195, and may provide out-of-phase AC output voltages to power a three-phase load. As similarly described above, the PFC subsystem 220 may receive input power (e.g., AC power) through the first input connector 405 with respect to the first neutral connector 410. The first leaf 450 may be used for the charging operation and the second leaf 455, the third leaf 460, and the fourth leaf 465 may be used for the three-phase operation. The bypass relay matrix 445 may include one or more bypass relays (see FIG. 5) which may be configured in the ON or OFF position to increase power depending on the application. The input power received at the first input connector 405 with respect to the first neutral connector 410 may be provided through one leaf (e.g., the first leaf 450, the second leaf 455, the third leaf 460, and/or the fourth leaf 465) to the bridge 470 and the DC-DC converter 230. The DC-DC converter 230 may be configured to convert the input power (e.g., AC power) to DC voltages for charging the battery pack 195. At the same time, the battery pack 195 may provide DC voltage to the DC-DC converter 230, and the DC-DC converter 230 may convert the DC voltage to AC voltage and may be provided to the PFC subsystem 220. The second leaf 455, the third leaf 460, and the fourth leaf 465 may be may be used for the three-phase operation. The bypass relay matrix 445 may include one or more bypass relays (see FIG. 5) which may be configured in the ON position. The AC voltage generated by the PFC subsystem 220 using the energy received from the DC-DC converter 230 may be three-phase and output on the first output connector 415, the second output connector 420, and the third output connector 425 for use by the grid, backup generator, or the like, with respect to the second neutral connector 430.

Figure 5:
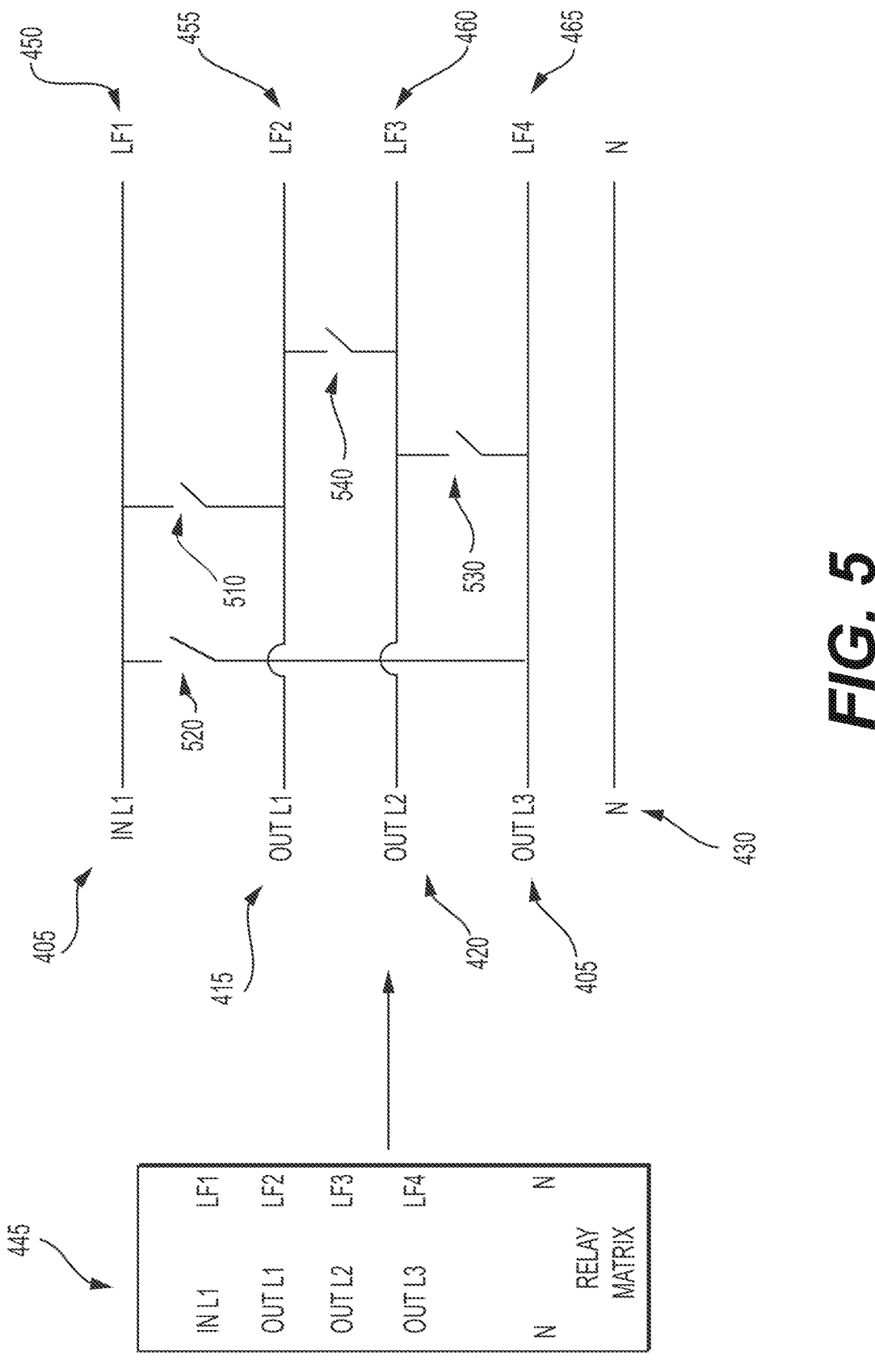
FIG. 5 depicts an exemplary electrical schematic for a relay matrix, according to one or more embodiments.

FIG. 5 depicts an exemplary electrical schematic for a relay matrix, according to one or more embodiments. The bypass relay matrix 445 may include a first bypass relay 510, a second bypass relay 520, a third bypass relay 530, and a fourth bypass relay 540. The first bypass relay 510 may be configured to connect the first leaf 450 to the second leaf 455. The second bypass relay 520 may be configured to connect the first leaf 450 to the fourth leaf 465. The third bypass relay 530 may be configured to connect the third leaf 460 to the fourth leaf 465. The fourth bypass relay 540 may be configured to connect the second leaf 455 to the third leaf 460. As described with respect to FIG. 4 above, the bypass relay matrix 445 including the one or more bypass relays (e.g., first bypass relay 510, second bypass relay 520, third bypass relay 530, and fourth bypass relay 540) may be configured to be in the ON or OFF position depending on the operation.

According to an embodiment, the PFC subsystem 220 may be configured in the OBC charging only operation, the bypass relay matrix 445 may be configured in the ON or OFF position depending on the power application. During the OBC charging only operation, one or more of the bypass relays (e.g., first bypass relay 510, second bypass relay 520, and third bypass relay 530) may be used to increase power, and each of the one or more bypass relays may be used to incrementally increase power. For example, during the OBC charging only operation, the first bypass relay 510 may be configured in the ON position to incrementally increase the power in addition to the one or more leaves (e.g., first leaf 450, second leaf 455, third leaf 460, and/or fourth leaf 465) in use. An another example, during the OBC charging only operation, the first bypass relay 510 and the second bypass relay 520 may both be configured in the ON position to incrementally increase the power in addition to the one or more leaves in use. Configuring the first bypass relay 510 and the second bypass relay 520 in the ON position may have a high power application than if only the first bypass relay 510 is configured in the ON position. Similarly, the first bypass relay 510, the second bypass relay 520, and the third bypass relay 530 may all be configured in the ON position to incrementally increase the power from the previous examples.

According to an embodiment, the PFC subsystem 220 may be configured in the OBC discharging only operation, the bypass relay matrix 445 may be configured in the ON or OFF position depending on the power application. During the OBC discharging only operation, one or more of the bypass relays (e.g., first bypass relay 510, third bypass relay 530, and fourth bypass relay 540) may be used to increase power, each of the one or more bypass relays may be used to incrementally increase power. For example, during the OBC discharging only operation, the first bypass relay 510 may be configured in the ON position to incrementally increase the power in addition to the one or more leaves (e.g., first leaf 450, second leaf 455, third leaf 460, and/or fourth leaf 465) in use. An another example, during the OBC discharging only operation, the first bypass relay 510 and the fourth bypass relay 540 may both be configured in the ON position to incrementally increase the power in addition to the one or more leaves in use. Configuring the first bypass relay 510 and the fourth bypass relay 540 in the ON position may have a high power application than if only the first bypass relay 510 is configured in the ON position. Similarly, the first bypass relay 510, the third bypass relay 530, and the fourth bypass relay 540 may all be configured in the ON position to incrementally increase the power from the previous examples.

According to an embodiment, the PFC subsystem 220 may be configured in the split-phase inverter operation, the bypass relay matrix 445 may be configured in the ON or OFF position depending on the power application. During the split-phase inverter operation, one or more of the bypass relays (e.g., first bypass relay 510 and third bypass relay 530) may be used to increase power, each of the one or more bypass relays may be used to incrementally increase power. For example, during the split-phase inverter operation, the first bypass relay 510 may be configured in the ON position to incrementally increase the power in addition to the one or more leaves (e.g., first leaf 450, second leaf 455, third leaf 460, and/or fourth leaf 465) in use. An another example, during the split-phase inverter operation, the first bypass relay 510 and the third bypass relay 530 may both be configured in the ON position to incrementally increase the power in addition to the one or more leaves in use. Configuring the first bypass relay 510 and the third bypass relay 530 in the ON position may have a high power application than if only the first bypass relay 510 is configured in the ON position.

According to an embodiment, the PFC subsystem 220 may be configured in the simultaneously charging and discharging operations, the bypass relay matrix 445 may be configured in the ON or OFF position depending on the power application. During the simultaneously charging and discharging operations, one or more of the bypass relays (e.g., second bypass relay 520, third bypass relay 530, and fourth bypass relay 540) may be used to increase power, each of the one or more bypass relays may be used to incrementally increase power for a particular operation. For example, during the simultaneously charging and discharging operations, the second bypass relay 520 may be configured in the ON position to increase the power in addition to the one or more leaves (e.g., first leaf 450, second leaf 455, third leaf 460, and/or fourth leaf 465) in use for the OBC charging operation. The fourth bypass relay 540 may be configured in the ON position to increase the power in addition to the one or more leaves in use for the OBC discharging operation. The third bypass relay 530 may be configured in the ON position to further increase the power of either the OBC charging operation or the OBC discharging operation in addition to the already in use bypass relay configured in the ON position. For example, the third bypass relay 530 may be used to increase the charging operation by utilizing the third leaf 460 with the fourth bypass relay 540 in the OFF position (e.g., open). In another example, the third bypass relay 530 may be used to increase the discharging operation by utilizing the fourth leaf 465 with the second bypass relay 520 in the OFF position (e.g., open).

According to an embodiment, the PFC subsystem 220 may be configured in the three-phase inverter, the bypass relay matrix 445 may be configured in the OFF position. For example, all of the bypass relays (e.g., first bypass relay 510, second bypass relay 520, third bypass relay 530, and fourth bypass relay 540) may all be configured in the open (e.g., OFF) position.

According to an embodiment, the PFC subsystem 220 may be configured in the simultaneous charging and split-phase operation, the bypass relay matrix 445 may be configured in the ON or OFF position depending on the power application. During the simultaneously charging and split-phase operations, one or more of the bypass relays (e.g., second bypass relay 520) may be used to increase power for a particular operation. For example, during the simultaneous charging and split-phase operations, the second bypass relay 520 may be configured in the ON position to increase the power in addition to the one or more leaves (e.g., first leaf 450 and fourth leaf 465) in use for the OBC charging operation.

According to an embodiment, the PFC subsystem 220 may be configured in the simultaneous charging, split-phase, and discharging operations, the bypass relay matrix 445 may be configured in the OFF position. For example, all of the bypass relays (e.g., first bypass relay 510, second bypass relay 520, third bypass relay 530, and fourth bypass relay 540) may be configured in the open (e.g., OFF) position.

According to an embodiment, the PFC subsystem 220 may be configured in the simultaneous charging and three-phase operations, the bypass relay matrix 445 may be configured in the OFF position. For example, all of the bypass relays (e.g., first bypass relay 510, second bypass relay 520, third bypass relay 530, and fourth bypass relay 540) may be configured in the open (e.g., OFF) position.

Figure 6:
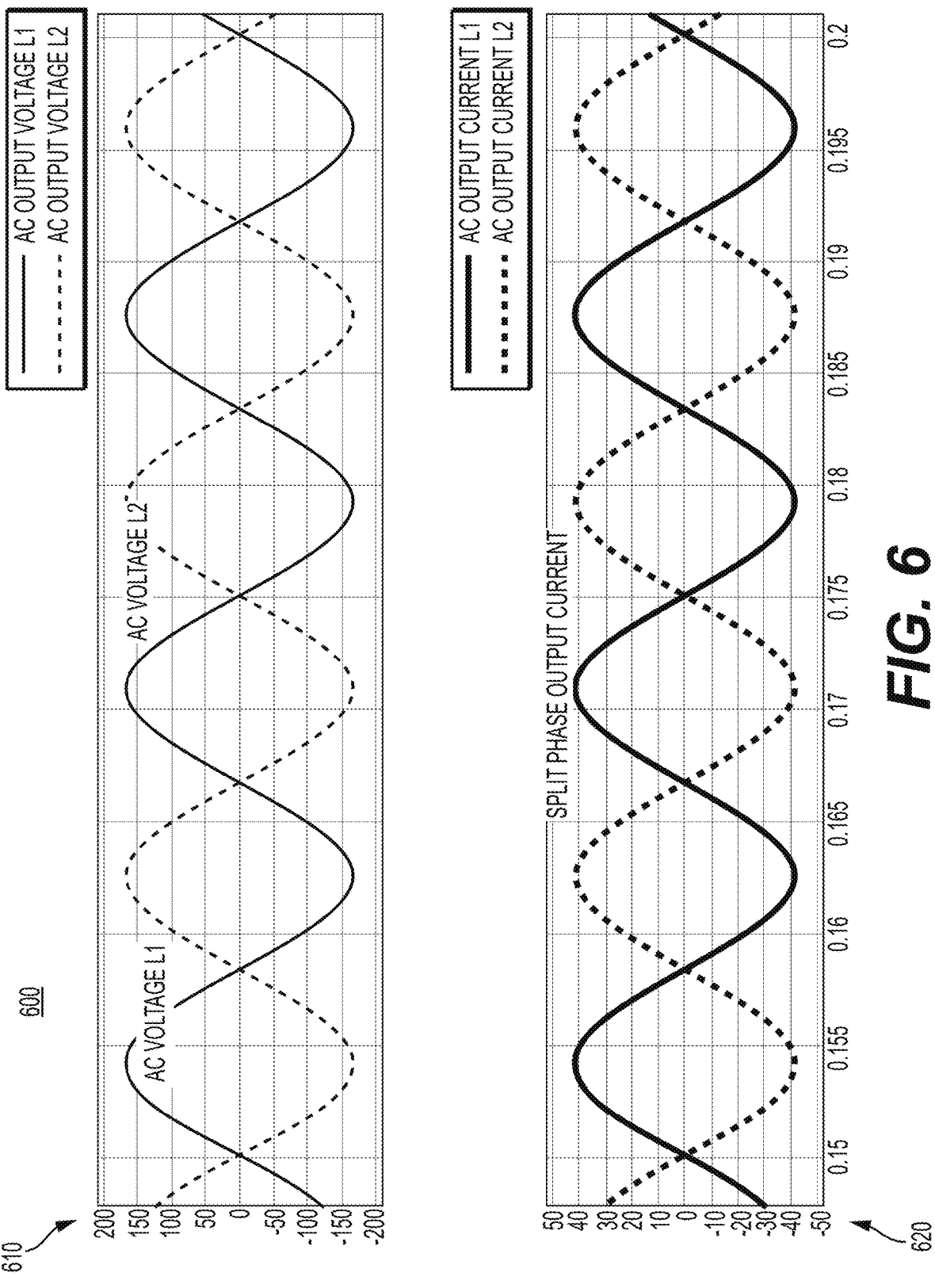
FIG. 6 depicts an exemplary simulation result of a split-phase operation of a battery charger, according to one or more embodiments.

FIG. 6 depicts an exemplary simulation result of a split-phase operation of a battery charger, according to one or more embodiments. Split-phase simulation 600 may include split-phase AC voltage generation 610 and split-phase output current 620. As described with respect to FIG. 4 above in the split-phase operation, the battery pack 195 may provide DC voltage to the DC-DC converter 230, and the DC-DC converter 230 may convert the DC voltage to AC voltage and may be provided to the PFC subsystem 220. The second leaf 455 and the third leaf 460 may be used for the split-phase operation. The second leaf 455 and the third leaf 460 may be combined with the first leaf 450 and the fourth leaf 465 to increase power if desired. The AC voltage (e.g., the split-phase output current 620) received from the DC-DC converter 230 may be split-phase and output between the first output connector 415 for use by the grid, backup generator, or the like, and the second output connector 420, with respect to the second neutral connector 430, for use by the AC outlets of the vehicle. For example, the split-phase AC voltage generation 610 may include the first output connector 415 outputting 120V and the second output connector 420 outputting (−) 120V, where the load is applied across both the first output connector 415 and the second output connector 420. Split-phase operation may increase power by activating more leaves (e.g., third leaf 460 and fourth leaf 465) and/or by turning ON the first bypass relay 510 and the third bypass relay 530.

Figure 7:
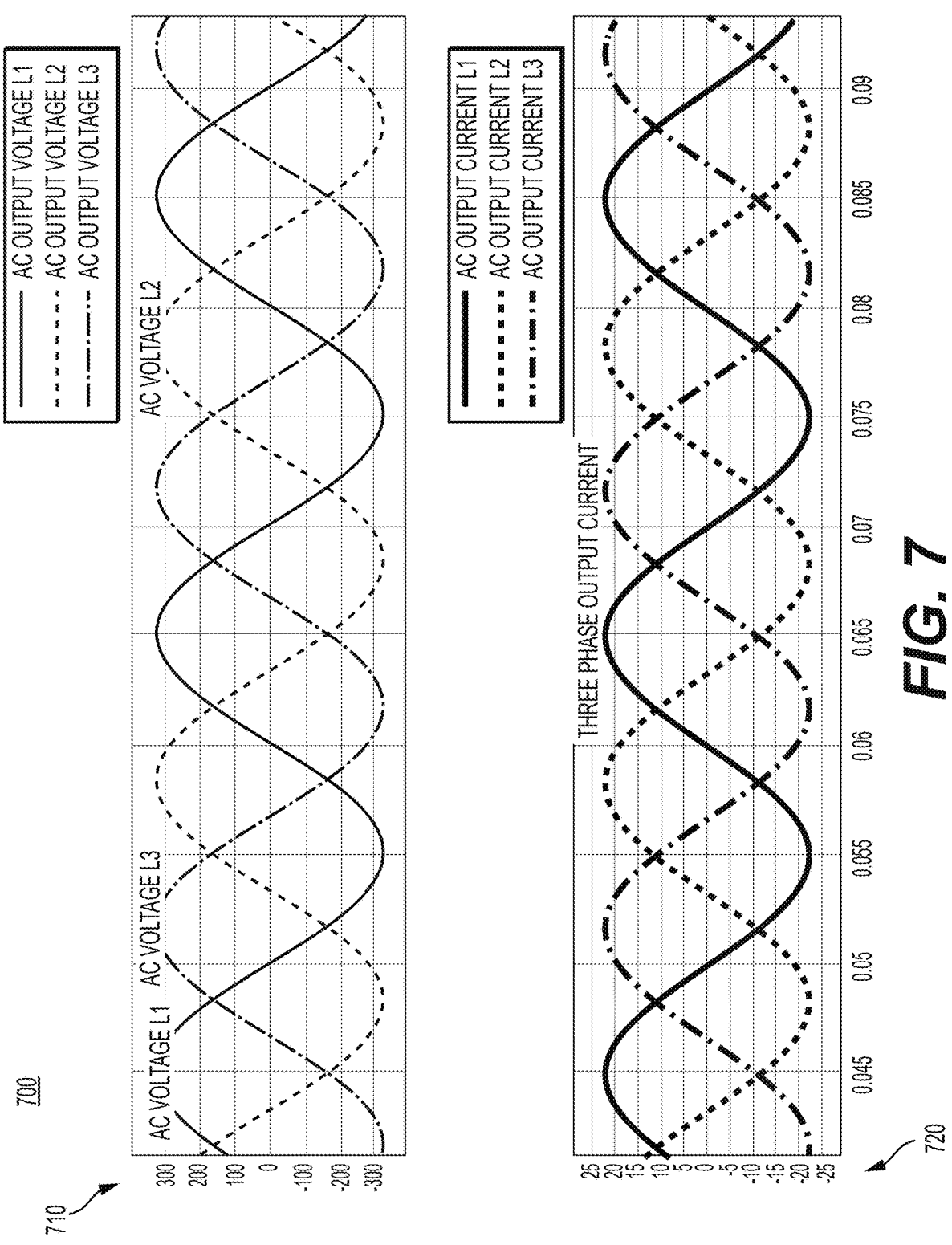
FIG. 7 depicts an exemplary simulation result of a three-phase operation of a battery charger, according to one or more embodiments.

FIG. 7 depicts an exemplary simulation result of a three-phase operation of a battery charger, according to one or more embodiments. Three-phase simulation 700 may include three-phase AC voltage generation 710 and three-phase output current 720. As described with respect to FIG. 4 above in the three-phase operation, the battery pack 195 may provide DC voltage to the DC-DC converter 230, and the DC-DC converter 230 may convert the DC voltage to AC voltage and may be provided to the PFC subsystem 220. The three-phase AC voltage generation 710 received from the DC-DC converter 230 may be three-phase and output between the first output connector 415, the second output connector 420, and the third output connector 425 with respect to the second neutral connector 430. For example, the three-phase AC voltage generation 710 may include the first output connector 415 outputting 230V, the second output connector 420 outputting 230V shifted 120 degrees from the first output connector 415, and the third output connector 425 outputting 230V shifted 240 degrees from the first output connector 415, where the load is applied across the first output connector 415, the second output connector 420, and the third output connector 425 with respect to the second neutral connector 430. Three-phase operation may include each of the bypass relays (e.g., first bypass relay 510, second bypass relay 520, third bypass relay 530, and fourth bypass relay 540) in the OFF position.

Figure 8:
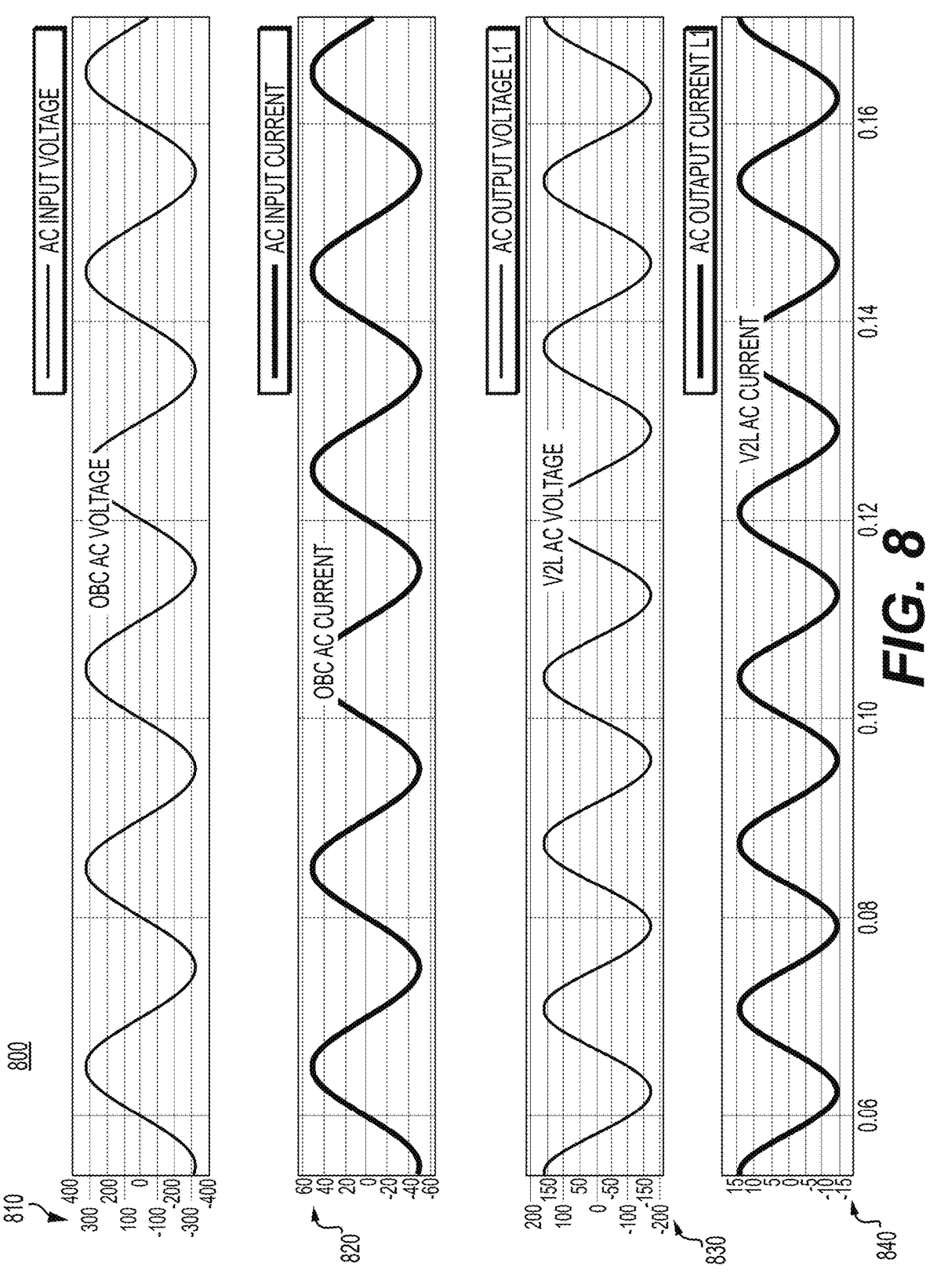
FIG. 8 depicts an exemplary simulation result of a simultaneous charging and discharging operation of the battery charger, according to one or more embodiments.

FIG. 8 depicts an exemplary simulation result of a simultaneous charging and discharging operations of the battery charger, according to one or more embodiments. The simultaneous charging and discharging simulation 800 may include OBC AC input voltage 810, OBC AC input current 820, V2L AC voltage generation 830, and V2L AC output current 840. As described with respect to FIG. 4 above in the simultaneous charging and discharging operation, the PFC subsystem 220 may receive input power (e.g., OBC AC input voltage 810) through the first input connector 405 with respect to the first neutral connector 410 to be provided to the DC-DC converter 230 at a respective current (e.g., OBC AC input current 820). The battery pack 195 may provide DC voltage to the DC-DC converter 230, and the DC-DC converter 230 may convert the DC voltage to AC voltage and may be provided to the PFC subsystem 220. The V2L AC voltage generation 830 received from the DC-DC converter 230 may be output to the first output connector 415. The OBC AC input current 820 may be 50 Hz and the V2L AC output current 80 may be 60 Hz. For example, the OBC AC input voltage 810 and the OBC AC input current 820 may be received at the first input connector 405 with respect to a neutral connector (e.g., first neutral connector 410) and the V2L AC voltage generation 830 and the V2L AC output current 840 may be output through the first output connector 415 with respect to a neutral connector (e.g., second neutral connector 430). Closing the second bypass relay 520 may increase the OBC power and closing the fourth bypass relay 540 may increase the V2L power. Closing the third bypass relay 530 may further increase either the OBC charging power or the V2L output power. For example, the third bypass relay 530 may be used to increase the charging operation by utilizing the third leaf 460 with the fourth bypass relay 540 in the OFF position (e.g., open). In another example, the third bypass relay 530 may be used to increase the discharging operation by utilizing the fourth leaf 465 with the second bypass relay 520 in the OFF position (e.g., open).

Figure 9:
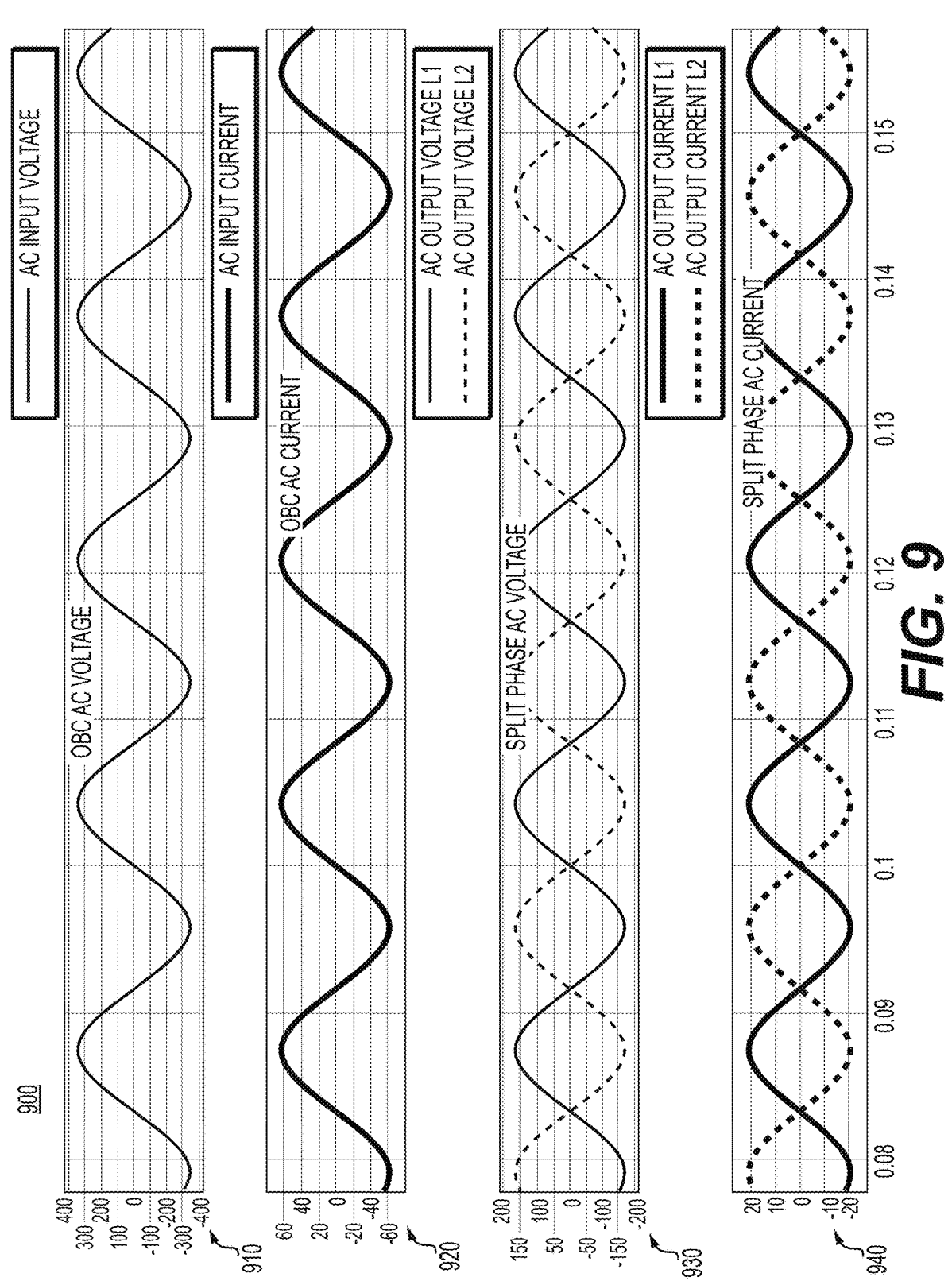
FIG. 9 depicts an exemplary simulation result of a simultaneous charging split-phase operation of the battery charger, according to one or more embodiments.

FIG. 9 depicts an exemplary simulation result of a simultaneous charging and split-phase operation of the battery charger, according to one or more embodiments. The simultaneous charging and split-phase simulation 900 may include OBC AC input voltage 910, OBC AC input current 920, split-phase AC voltage generation 930, and split-phase AC output current 940. As described with respect to FIG. 4 above in the simultaneous charging and split-phase operation, the PFC subsystem 220 may receive input power (e.g., OBC AC input voltage 910) through the first input connector 405 with respect to the first neutral connector 410 to be provided to the DC-DC converter 230 at a respective current (e.g., OBC AC input current 920). The battery pack 195 may provide DC voltage to the DC-DC converter 230, and the DC-DC converter 230 may convert the DC voltage to AC voltage and may be provided to the PFC subsystem 220. The AC voltage (e.g., the split-phase AC voltage generation 930) received from the DC-DC converter 230 may be split-phase and output (e.g., split-phase AC output current 940) between the first output connector 415 for use by the grid, backup generator, or the like, and the second output connector 420, with respect to the second neutral connector 430, for use by the AC outlets of the vehicle. Closing the second bypass relay 520 may increase the OBC charging power.

Figure 10:
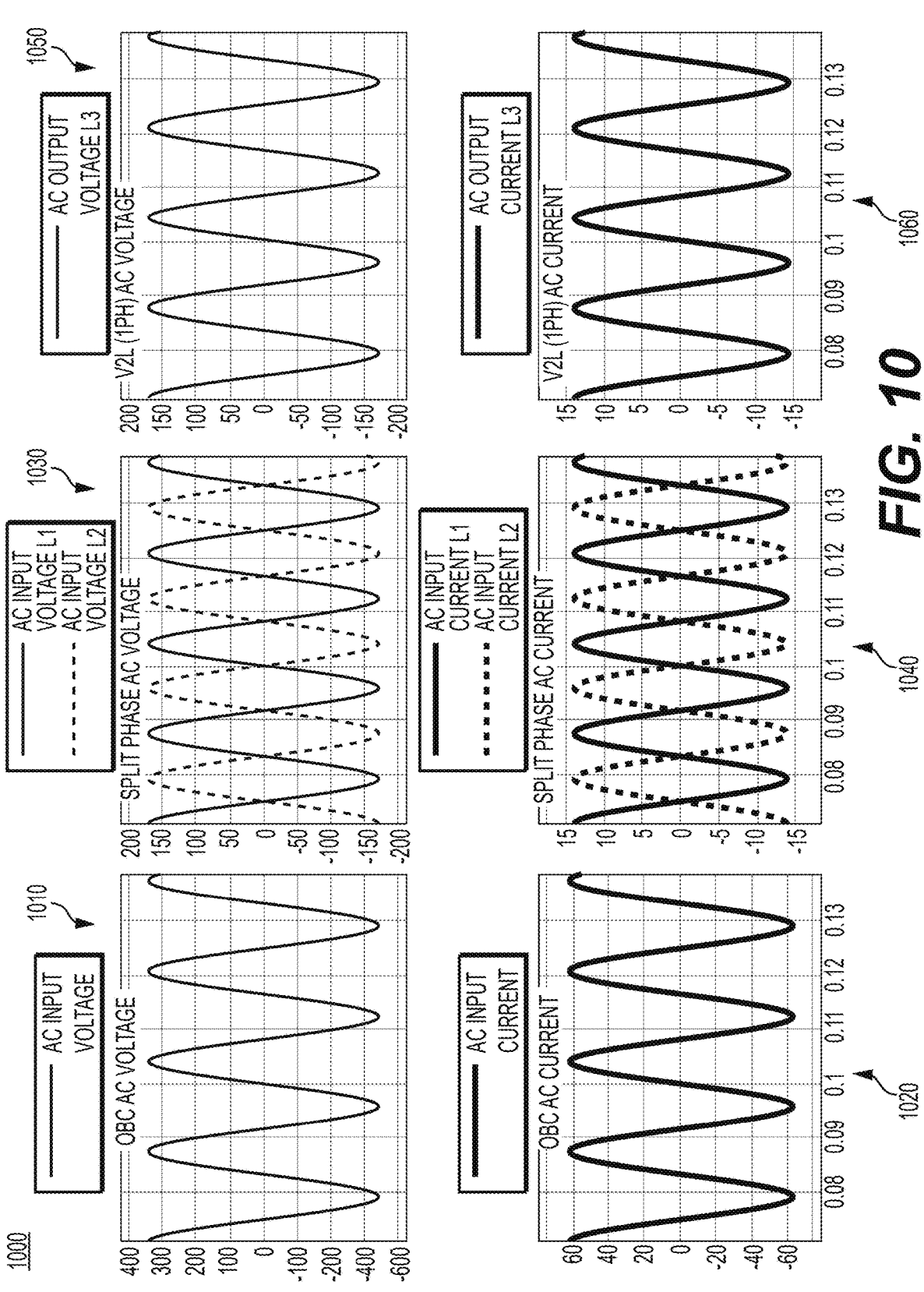
FIG. 10 depicts an exemplary simulation result of a simultaneous charging, split-phase, and discharging operation of the battery charger, according to one or more embodiments.

FIG. 10 depicts an exemplary simulation result of a simultaneous charging, split-phase, and discharging operation of the battery charger, according to one or more embodiments. The simultaneous charging, split-phase, and discharging simulation 1000 may include OBC AC input voltage 1010, OBC AC input current 1020, split-phase AC voltage generation 1030, split-phase AC output current 1040, V2L AC output voltage 1050, and V2L AC output current 1060. As described with respect to FIG. 4 above in the simultaneous charging, split-phase, and discharging operation the PFC subsystem 220 may receive input power (e.g., OBC AC input voltage 1010) through the first input connector 405 with respect to the first neutral connector 410 to be provided to the DC-DC converter 230 at a respective current (e.g., OBC AC input current 1020). The battery pack 195 may provide DC voltage to the DC-DC converter 230, and the DC-DC converter 230 may convert the DC voltage to AC voltage and may be provided to the PFC subsystem 220. The AC voltage (e.g., the split-phase AC voltage generation 1030) received from the DC-DC converter 230 may be split-phase and output (e.g., split-phase AC output current 1040) between the first output connector 415 for use by the grid, backup generator, or the like, and the second output connector 420, with respect to a neutral connection (e.g., second neutral connector 430), for use by the AC outlets of the vehicle. The V2L AC output voltage 1050 received from the DC-DC converter 230 may be output to the third output connector 425 with respect to a neutral connection (e.g., second neutral connector 430).

Figure 11:
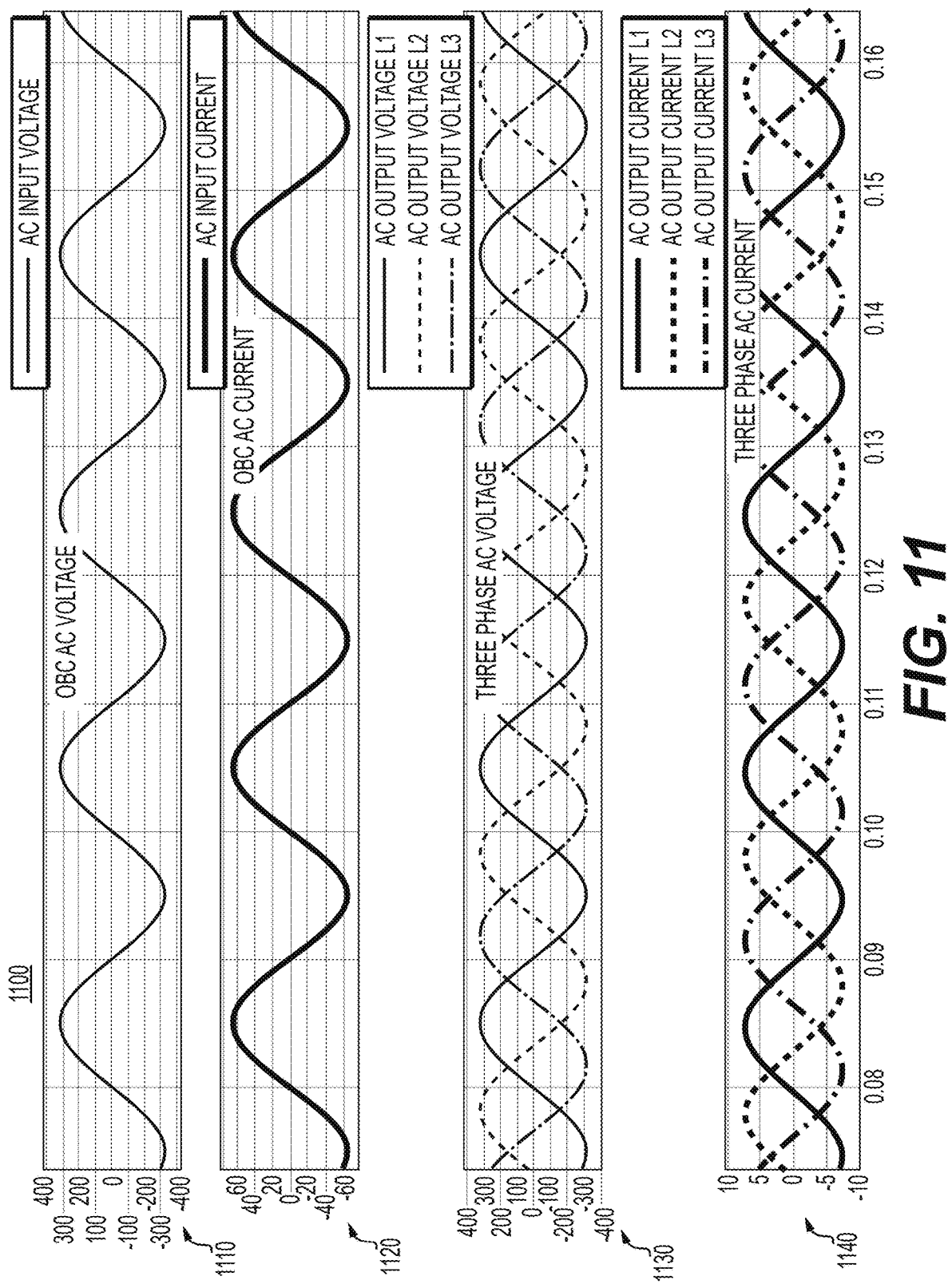
FIG. 11 depicts an exemplary simulation result of a simultaneous charging and three-phase operation of the battery charger, according to one or more embodiments.

FIG. 11 depicts an exemplary simulation result of a simultaneous charging and three-phase operation of the battery charger, according to one or more embodiments. The simultaneous charging and three-phase simulation 1100 may include OBC AC input voltage 1110, OBC AC input current 1120, three-phase AC voltage generation 1130, and three-phase AC output current 1140. As described with respect to

23

FIG. 4 above in the simultaneous charging three-phase operation the PFC subsystem 220 may receive input power (e.g., OBC AC input voltage 1110) through the first input connector 405 with respect to the first neutral connector 410 to be provided to the DC-DC converter 230 at a respective current (e.g., OBC AC input current 1120). The battery pack 195 may provide DC voltage to the DC-DC converter 230, and the DC-DC converter 230 may convert the DC voltage to AC voltage and may be provided to the PFC subsystem 220. The three-phase AC voltage generation 1130 received from the DC-DC converter 230 may be three-phase and output between the first output connector 415, the second output connector 420, and the third output connector 425 with respect to the second neutral connector 430. Each of the bypass relays (e.g., first bypass relay, second bypass relay, third bypass relay, and fourth bypass relay) may all be configured in the OFF position.

One or more embodiments may provide more options for power conversion by fully utilizing the power stages of the OBC to perform (1) OBC charging operation (e.g., charging HV battery), (2) OBC discharging operation (e.g., supplying AV power to loads/grids), (3) split-phase inverter operation (e.g., supply split-phase power to loads/home/grids), (4) simultaneously charging and discharging operations, (5) three-phase inverter operation (e.g., supply three-phase power to load/home/grid), (6) simultaneous charging and split-phase operation, (7) simultaneous charging, split-phase, and discharging operations, and (8) simultaneous charging and three-phase operations. This design may combine the charging and discharging (e.g., single-phase, split-phase, and three-phase) inverter products into the same hardware with the option of performing charging (e.g., single-phase input) and discharging operation (e.g., single-phase, split-phase, and three-phase) at the same time. The combined converter approach may reduce the component count, increase power density, and reduce overall product size needed to perform all eight operations. The PFC hardware may be operated to achieve all power conversion options while maintaining the same DC/DC converter section. Utilizing the bypass relay(s), the four PFC leaves may be operated in pairs to distribute the power during lower power operation and equalize the utilization of the PFC leaves during the lifetime of the product. During the OBC discharging only operation (e.g., single-phase output), high power and better EMI performance may be achieved by utilizing the four PFC leaves and turning ON the bypass relay. This may allow for increased utilization of the product hardware. The four PFC leaves may be switched at 90 degree phase shifts, allowing for more efficient ripple cancellation and reducing EMI noise. If lower power is needed, the bypass relay may be turned off and a lower number of PFC leaves may be operated to achieve higher efficiency, while maintaining good EMI performance due to ripple cancellation of the out-of-phase switching PWM.

Utilizing the bypass relay, the four PFC leaves may be operated in pairs to distribute the power during lower power operation and equalize the utilization of the PFC leaves during the lifetime of the product. In addition, the OBC discharging output may be generated at four different connector locations on the product thus reducing the wiring needed in the vehicle. The simultaneous operation may ensure full utilization of hardware and may reduce the amount of neutral current in the neutral half bridge of the PFC, hence reducing overall losses. By maximizing the PFC utilization, the high voltage DC-DC converter of the OBC may be designed for rated power of the product and the PFC subsystem may provide the flexibility to perform different power conversion options.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for an on-board charger, the system comprising:
   a battery charger including:
   a direct current to direct current (DC-DC) converter connected to a power factor correction (PFC) subsystem, wherein the PFC subsystem includes one or more leaves,
   wherein the one or more leaves of the PFC subsystem are operable to configure the PFC subsystem into each of a three-phase operation, a simultaneous charging and split-phase operation, a simultaneous charging, discharging, and split-phase operation, and a simultaneous charging and three-phase operation.

2. The system of claim 1, wherein the on-board charger further includes:
   a neutral half bridge connected to the one or more leaves;
   four bypass relays, wherein each of the four bypass relays are connected to each of the one or more leaves and a power input; and
   an alternating current (AC) electromagnetic interference (EMI) filter connected between the one or more leaves and the four bypass relays.

3. The system of claim 1, wherein the one or more leaves of the PFC subsystem are further operable to configure the PFC subsystem into each of a charging operation, a discharging operation, a split-phase operation, and a simultaneous charging and discharging operation.

4. The system of claim 3, wherein the one or more leaves include:
   a first leaf including a first inductor, a first upper switch, and a first lower switch, the first inductor connected to the first upper switch and the first lower switch;
   a second leaf including a second inductor, a second upper switch, and a second lower switch, the second inductor connected to the second upper switch and the second lower switch;
   a third leaf including a third inductor, a third upper switch, and a third lower switch, the third inductor connected to the third upper switch and the third lower switch; and
   a fourth leaf including a fourth inductor, a fourth upper switch, and a fourth lower switch, the fourth inductor connected to the fourth upper switch and the fourth lower switch.

5. The system of claim 4, wherein the charging operation is configured to activate the first leaf and the second leaf, and turn off a bypass relay to charge a battery connected to a first power input, wherein each of the first leaf and the second leaf are configured at 180 degree phase shifts.

6. The system of claim 4, wherein the discharging operation is configured to activate the first leaf and the second leaf, and turn off a bypass relay to output AC power received from the DC-DC converter through a first output, wherein each of the first leaf and the second leaf are configured at 180 degree phase shifts.

7. The system of claim 4, wherein the split-phase operation configured to activate the second leaf and the third leaf to output AC power received from the DC-DC converter at a first output voltage and a second output voltage, wherein the first leaf and the second leaf are out-of-phase.

8. The system of claim 4, wherein the simultaneous charging and discharging operation is configured to:

operate the first leaf and the fourth leaf to charge a battery connected to a first power input; and operate the second leaf and the third leaf to output AC power received from the DC-DC converter through a first output.

9. The system of claim 4, wherein the three-phase operation is configured to:

operate the second leaf, the third leaf, and the fourth leaf to output AC power received from the DC-DC converter at a first output voltage, a second output voltage, and a third output voltage, wherein the second leaf, the third leaf, and the fourth leaf are 120 degrees out-of-phase.

10. The system of claim 4, wherein the simultaneous charging and split-phase operation is configured to:

operate the first leaf to charge a battery connected to a first power input; and operate the second leaf and the third leaf to output AC power received from the DC-DC converter at a first output voltage and a second output voltage, wherein the second leaf and the third leaf are out-of-phase.

11. The system of claim 4, wherein the simultaneous charging, discharging, and split-phase operation is configured to:

operate the first leaf to charge a battery connected to a first power input;

operate the second leaf and the third leaf to output AC power received from the DC-DC converter through a first output at a first output voltage and through a second output a second output voltage, wherein the second leaf and the third leaf are out-of-phase; and operate the fourth leaf to output AC power received from the DC-DC converter through a third output.

12. The system of claim 4, wherein the simultaneous charging and three-phase operation is configured to:

operate the first leaf to charge a battery connected to a first power input; and operate the second leaf, the third leaf, and the fourth leaf to output AC power received from the DC-DC converter at a first output voltage, a second output voltage, and a third output voltage, wherein the second leaf, the third leaf, and the fourth leaf are out-of-phase.

13. The system of claim 1, further comprising:

a battery connected to the DC-DC converter of the battery charger, wherein the battery charger receives input AC power through the PFC subsystem, convert the AC power to DC power, and provide the DC power to the battery to charge the battery, and receives DC power from the battery through the DC-DC converter, convert the DC power to AC power, and provide the AC power through the PFC subsystem as output AC power, and a motor configured to rotate based on power received from the battery, wherein the system is provided as a vehicle.

14. A power factor correction (PFC) system comprising:

a first leaf including a first inductor, a first upper switch, and a first lower switch, the first inductor connected to the first upper switch and the first lower switch;

a second leaf including a second inductor, a second upper switch, and a second lower switch, the second inductor connected to the second upper switch and the second lower switch;

a third leaf including a third inductor, a third upper switch, and a third lower switch, the third inductor connected to the third upper switch and the third lower switch;

a fourth leaf including a fourth inductor, a fourth upper switch, and a fourth lower switch, the fourth inductor connected to the fourth upper switch and the fourth lower switch;

a first bypass relay connected to the first leaf and the second leaf;

a second bypass relay connected to the first leaf and the fourth leaf;

a third bypass relay connected to the third leaf and the fourth leaf; and a fourth bypass relay connected to the second leaf and the third leaf.

15. The PFC system of claim 14, wherein the first leaf, the second leaf, the third leaf, and the fourth leaf are operable to configure the PFC system into each of a three-phase operation, a simultaneous charging and split-phase operation, a simultaneous charging, discharging, and split-phase operation, and a simultaneous charging and three-phase operation.

16. The PFC system of claim 15, wherein the first leaf, the second leaf, the third leaf, and the fourth leaf are further operable to configure the PFC system into each of a charging operation, a discharging operation, a split-phase operation, and a simultaneous charging and discharging operation.

17. The PFC system of claim 15, wherein the three-phase operation is configured to operate the second leaf, the third leaf, and the fourth leaf to output AC power received from a DC-DC converter at a first output voltage, a second output voltage, and a third output voltage, wherein the second leaf, the third leaf, and the fourth leaf are 120 degrees out-of-phase, wherein the simultaneous charging and split-phase operation is configured to operate the first leaf to charge a battery connected to a first power input, and operate the second leaf and the third leaf to output AC power received from the DC-DC converter at a first output voltage and a second output voltage, wherein the second leaf and the third leaf are out-of-phase, wherein the simultaneous charging, discharging, and split-phase operation is configured to operate the first leaf to charge a battery connected to a first power input; and operate the second leaf and the third leaf to output AC power received from the DC-DC converter at a first output voltage and a second output voltage, wherein the second leaf and the third leaf are out-of-phase, and operate the fourth leaf to output AC power received from the DC-DC converter through a first output, and wherein the simultaneous charging and three-phase operation is configured to operate the first leaf to charge a battery connected to a first power input, and operate the second leaf, the third leaf, and the fourth leaf to output AC power received from the DC-DC converter at a first output voltage, a second output voltage, and a third output voltage, wherein the second leaf, the third leaf, and the fourth leaf are out-of-phase.

18. A method comprising:

operating a second leaf, a third leaf, and a fourth leaf of a PFC subsystem to perform a three-phase operation, wherein the three-phase operation is configured to output AC power received from a DC-DC converter at a first output voltage, a second output voltage, and a third output voltage;

operating a first leaf, the second leaf, and the third leaf of the PFC subsystem to perform a simultaneous charging and split-phase operation, wherein the simultaneous charging and split-phase operation is configured to charge a battery connected to a first power input and output AC power received from the DC-DC converter at the first output voltage and the second output voltage;

operating the first leaf, the second leaf, the third leaf, and the fourth leaf of the PFC subsystem to perform a simultaneous charging, discharging, and split-phase operation, wherein the simultaneous charging, discharging, and split-phase operation is configured to charge the battery connected to the first power input, output AC power received from the DC-DC converter at the first output voltage and the second output voltage, and output AC power received from the DC-DC converter through a first output; and operating the first leaf, the second leaf, the third leaf, and the fourth leaf of the PFC subsystem to perform a simultaneous charging and three-phase operation, wherein the simultaneous charging and three-phase operation is configured to charge the battery connected to the DC-DC converter and output AC power received from the DC-DC converter at the first output voltage, the second output voltage, and the third output voltage.

19. The method of claim 18, further comprising:

operating the first leaf and the second leaf of the PFC subsystem to perform a charging operation, wherein the charging operation is configured to charge the battery connected to the DC-DC converter; and operating the first leaf and the second leaf of the PFC subsystem to perform a discharging operation, wherein the discharging operation is configured to output AC power received from the DC-DC converter.

20. The method of claim 19, further comprising:

operating the second leaf and the third leaf of the PFC subsystem to perform a split-phase operation, wherein the split-phase operation is configured to output out-of-phase AC power received from the DC-DC converter; and operating the first leaf, the second leaf, the third leaf, and the fourth leaf of the PFC subsystem to perform a simultaneous charging and discharging operation, wherein the simultaneous charging and discharging operation is configured to charge the battery connected to the DC-DC converter and output AC power received from the DC-DC converter.

\* \* \* \* \*